US012793158B2

(12) United States Patent
Kang

(10) Patent No.: US 12,793,158 B2
(45) Date of Patent: *Nov. 10, 2026

(54) VEHICLE TERMINAL DEVICE, SERVICE SERVER, METHOD, COMPUTER PROGRAM, COMPUTER READABLE RECORDING MEDIUM FOR PROVIDING DRIVING RELATED GUIDANCE SERVICE

(71) Applicant: THINKWARE CORPORATION, Seongnam-si (KR)

(72) Inventor: Young Su Kang, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 155 days.

This patent is subject to a terminal disclaimer.

(21) Appl. No.: 18/539,562

(22) Filed: Dec. 14, 2023

(65) Prior Publication Data

US 2024/0112292 A1 Apr. 4, 2024

Related U.S. Application Data

(63) Continuation of application No. 17/114,873, filed on Dec. 8, 2020, now Pat. No. 11,861,754.

(30) Foreign Application Priority Data

Dec. 10, 2019 (KR) ........................ 10-2019-0164008

(51) Int. Cl.
*G06Q 50/00* (2024.01)
*B60W 30/095* (2012.01)
(Continued)

(52) U.S. Cl.
CPC ......... *G06Q 50/40* (2024.01); *B60W 30/0956* (2013.01); *B60W 40/072* (2013.01);
(Continued)

(58) Field of Classification Search
CPC ...... G06Q 50/40; G06Q 30/018; G06Q 50/18; G06Q 10/20; G06Q 40/08; G06Q 50/26;
(Continued)

(56) References Cited

U.S. PATENT DOCUMENTS 6,363,308 B1 3/2002 Caruso et al.
6,600,414 B2 7/2003 Foo et al.
(Continued)

FOREIGN PATENT DOCUMENTS

EP 3159853 B1 3/2019
JP 8-241491 A 9/1996
(Continued)

OTHER PUBLICATIONS

Extended European Search Report dated Dec. 4, 2023 , issued in counterpart EP Application No. 23196048.5 (7 pages).
(Continued)

*Primary Examiner* — Peter D Nolan
*Assistant Examiner* — Peter Y Ning
(74) *Attorney, Agent, or Firm* — WHDA, LLP

(57) ABSTRACT

There is provided a method for providing a driving related guidance service by a service server. The method includes receiving advanced driver assistance system (ADAS) data of a vehicle related to a specific driving situation of the vehicle, location data of the vehicle, driving data of the vehicle, and a driving image captured during driving of the vehicle from a vehicle terminal device, generating guidance information related to the specific driving situation of the vehicle by analyzing the received data and the driving image, and providing a driving related guidance service for the vehicle using the generated guidance information.

20 Claims, 13 Drawing Sheets

1000

(51) Int. Cl.

| | |
|---|---|
| ***B60W 40/072*** | (2012.01) |
| ***B60W 50/14*** | (2020.01) |
| ***G05B 13/02*** | (2006.01) |
| ***G05B 13/04*** | (2006.01) |
| ***G05D 1/00*** | (2006.01) |
| ***G06Q 30/018*** | (2023.01) |
| ***G06Q 50/18*** | (2012.01) |
| ***G06Q 50/40*** | (2024.01) |
| ***G06V 10/82*** | (2022.01) |
| ***G06V 20/56*** | (2022.01) |
| ***G06V 20/58*** | (2022.01) |
| ***G08G 1/127*** | (2006.01) |
| ***G09B 19/16*** | (2006.01) |
| ***H04N 5/265*** | (2006.01) |
| *B60W 30/08* | (2012.01) |
| *G06Q 10/20* | (2023.01) |
| *G06Q 40/08* | (2012.01) |

(52) U.S. Cl.

CPC ......... *B60W 50/14* (2013.01); *G05B 13/0265* (2013.01); *G05B 13/048* (2013.01); *G05D 1/021* (2013.01); *G06Q 30/018* (2013.01); *G06Q 50/18* (2013.01); *G06V 10/82* (2022.01); *G06V 20/56* (2022.01); *G06V 20/58* (2022.01); *G08G 1/127* (2013.01); *G09B 19/167* (2013.01); *H04N 5/265* (2013.01); *B60W 2030/082* (2013.01); *B60W 2420/403* (2013.01); *B60W 2552/00* (2020.02); *B60W 2556/10* (2020.02); *B60W 2556/45* (2020.02); *G06Q 10/20* (2013.01); *G06Q 40/08* (2013.01); *G06V 2201/08* (2022.01)

(58) Field of Classification Search

CPC ........... B60W 30/0956; B60W 40/072; B60W 50/14; B60W 2030/082; B60W 2420/403; B60W 2552/00; B60W 2556/10; B60W 2556/45; B60W 30/08; B60W 40/02; G05B 13/0265; G05B 13/048; G05D 1/021; G06V 10/82; G06V 20/56; G06V 20/58; G06V 2201/08; G08G 1/127; G08G 1/0112; G08G 1/012; G08G 1/0129; G08G 1/0145; G08G 1/096741; G08G 1/096775; G08G 1/143; G08G 1/144; G08G 1/164; G08G 1/167; G08G 1/166; G09B 19/167; H04N 5/265; G06F 18/2414; G01C 21/3626; G01C 21/3617; G07C 5/0808; G07C 5/008; B60R 21/013; B60Y 2300/08

See application file for complete search history.

(56) References Cited

U.S. PATENT DOCUMENTS

| | | | | |
|---|---|---|---|---|
| 8,954,226 | B1 * | 2/2015 | Binion | G07C 5/008 701/33.4 |
| 9,373,202 | B2 | 6/2016 | Shimizu et al. | |
| 10,319,039 | B1 | 6/2019 | Konrardy et al. | |
| 10,748,419 | B1 * | 8/2020 | Fields | G08G 1/166 |
| 10,832,331 | B1 * | 11/2020 | Davis | G07C 5/008 |
| 10,958,866 | B2 | 3/2021 | Teruuchi | |
| 11,514,482 | B2 * | 11/2022 | Kawashima | G07C 5/008 |
| 2015/0039397 | A1 * | 2/2015 | Fuchs | G06Q 30/0283 705/7.35 |
| 2016/0189303 | A1 * | 6/2016 | Fuchs | G06Q 40/08 705/4 |
| 2017/0072851 | A1 * | 3/2017 | Shenoy | G08G 1/096775 |
| 2018/0082132 | A1 * | 3/2018 | Spampinato | G06V 20/58 |
| 2020/0286382 | A1 * | 9/2020 | Avedisov | G08G 1/096775 |
| 2020/0294401 | A1 * | 9/2020 | Kerecsen | G08G 1/205 |

FOREIGN PATENT DOCUMENTS

| | | | | |
|---|---|---|---|---|
| JP | 2000-142321 | A | 5/2000 | |
| JP | 2002-286745 | A | 10/2002 | |
| JP | 2003-63459 | A | 3/2003 | |
| JP | 2005-32027 | A | 2/2005 | |
| JP | 2012-94972 | A | 5/2012 | |
| JP | 2013-054560 | A | 3/2013 | |
| JP | 2014-89491 | A | 5/2014 | |
| JP | 2014-133478 | A | 7/2014 | |
| JP | 2015-147520 | A | 8/2015 | |
| JP | 2016-81087 | A | 5/2016 | |
| JP | 2018-120290 | A | 8/2018 | |
| JP | 2019-200777 | A | 11/2019 | |
| KR | 2013 0086681 | A | 8/2013 | |
| KR | 10-2015-0000350 | A | 1/2015 | |
| KR | 101 656 302 | B1 | 9/2016 | |
| KR | 10-2019-0017339 | A | 2/2019 | |
| KR | 10-2019-126024 | A | 11/2019 | |
| WO | 2008/038604 | A1 | 4/2008 | |
| WO | 2014/207558 | A3 | 12/2014 | |
| WO | WO-2014207558 | A2 * | 12/2014 | G07C 5/0841 |
| WO | 2019/146488 | A1 | 8/2019 | |

OTHER PUBLICATIONS

Extended European Search Report dated Jan. 8, 2024, issued in counterpart EP Application No. 23196048.5. (2 pages).
Office Action dated Mar. 11, 2025, issued in counterpart Korean patent application No. 10-2019-0164008, with English translation. (21 pages).
Office Action dated Mar. 18, 2025, issued in counterpart Korean patent application No. 2020-203670, with English translation. (4 pages).
Office Action dated Oct. 22, 2024, issued in counterpart JP Application No. 2020-203670 with English translation (10 pages).
Extended European Search Report dated Apr. 6, 2021, issued in counterpart EP Application No. 20212813.8. (10 pages).
Written Decision on Registration dated Dec. 29, 2025, issued in counterpart Korean patent application No. 10-2019-0164008 (2 pages).
Intention to grant dated Oct. 10, 2025, issued in counterpart European patent application No. 23196048.5 (6 pages).
Office Action dated Aug. 26, 2025, issued in counterpart Japanese patent application No. 2020-203670 with English translation (8 pages).
Department of Transportation, National Highway Traffic Safety Administration, 49 CFR Part 563, [Docket No. NHTSA-2006-25666], Rin 2127-AI72, Event Data Recorders, Aug. 2006 (207 pages).
NCHRP Web-Only Document 75 (Project 17-24): Contractor's Final Report: Use of Event Data Recorder (EDR) Technology for Highway Crash Data Analysis, Dec. 2004 (210 pages).

* cited by examiner

VEHICLE TERMINAL DEVICE, SERVICE SERVER, METHOD, COMPUTER PROGRAM, COMPUTER READABLE RECORDING MEDIUM FOR PROVIDING DRIVING RELATED GUIDANCE SERVICE

CROSS-REFERENCE TO RELATED APPLICATION

This application is a continuation application of U.S. patent application Ser. No. 17/114,873 filed on Dec. 8, 2020, which claims the priority and benefit of Korean Patent Application No. 10-2019-0164008 filed on Dec. 10, 2019, with the Korean Intellectual Property Office, the disclosure of which is incorporated herein by reference.

BACKGROUND OF THE INVENTION

1. Field of the Invention

The present invention relates to a vehicle terminal device, service server, method, computer program, and computer-readable recording medium for providing a driving related guidance service, and more particularly, to a vehicle terminal device, service server, method, computer program, and computer-readable recording medium for providing a driving related guidance service based on images captured during driving of a vehicle (i.e., while a vehicle is moving) and various data acquired during driving of the vehicle.

2. Description of the Related Art

The rapid development of an automobile technology has brought about an increase in vehicles worldwide and a location-based service (LBS) related to vehicles has also been activated in line with such an increase in vehicles.

A typical device using such an LBS is a vehicle navigation system that locates a current location of a vehicle or the like or guides a moving route to a destination.

In addition, recently, vehicle black boxes that may provide objective data have been used to determine a negligence rate based on the responsibility of an accident that occurs during stopping or driving of vehicles, and the LBS is also provided through vehicle black boxes as the performance is improved.

As such, with the generalized use of various vehicle terminal devices, measures to increase driving stability of drivers and consumers' needs for various additional services for driver's convenience have gradually increased.

SUMMARY

An aspect of the present invention may provide a vehicle terminal device, service server, method, computer program, and computer-readable recording medium for providing an accident situation prediction guidance service and an accident legal guidance service using advanced driver assistance system (ADAS) data, location data, driving data, and driving image related to a specific driving situation detected during driving of a vehicle.

An aspect of the present invention may also provide a vehicle terminal device, service server, method, computer program, and computer-readable recording medium for providing a driving related guidance service to a vehicle driver using past driving history data of the driver and past driving history data of another driver.

According to an aspect of the present invention, a method for providing a driving related guidance service by a vehicle terminal device may include: acquiring a driving image captured during driving of a vehicle; receiving advanced driver assistance system (ADAS) data of the vehicle from an ADAS module that assists driving of the vehicle and receiving driving data of the vehicle from an electronic control unit (ECU) module of the vehicle; receiving location data of the vehicle; and transmitting, to a service server, the ADAS data, the location data, the driving data, and the driving image related to a specific driving situation detected during driving of the vehicle.

The method may further include: transmitting, when a first driving situation in which an accident did not occur while the vehicle was moving but which involved an accident likelihood is detected, the ADAS data, the location data, the driving data, and the driving image before point in time of the detected first driving situation.

The method may further include: transmitting, to the service server, the ADAS data, the location data, the driving data, and the driving image before and after a predetermined period of time from a point in time of a second driving situation in which an accident occurred during driving of the vehicle, when the second driving situation is detected.

The acquiring of the driving image captured during driving of the vehicle may include acquiring a front driving image captured by a front camera and a rear driving image captured by a rear camera, and may further include: combining the front driving image and the rear driving image and generating a top-view image in which a host vehicle object is placed at a location of a host vehicle in the combined image, wherein the driving image transmitted to the service server may be the top-view image.

The top-view image may have a graphics interchange format (GIF) format formed by extracting a plurality of frames.

The method may further include: when accident situation prediction information on an accident situation which might have occurred in the vehicle is generated based on the data received from the vehicle terminal device in the service server, receiving the generated accident situation prediction information; and performing guidance based on the received accident situation prediction information.

The method may further include: when accident legal evaluation information is generated based on the data received from the vehicle terminal device in the service server, receiving the generated accident legal evaluation information; and performing guidance based on the received accident legal evaluation information.

The method may further include: detecting an impact level; determining the first driving situation which involves an accident likelihood when an impact which exceeds a preset first impact level and which is less than a preset second impact level is detected and when at least one of a lane departure notification, a forward collision, a sharp curve notification, a sudden stop notification, a sudden turn notification, and a blind spot notification is detected based on the ADAS data before the impact is detected; and determining the second driving situation in which an accident occurred when an impact which exceeds the preset second impact level is detected.

According to another aspect of the present invention, a method for providing a driving related guidance service by a service server may include: receiving advanced driver assistance system (ADAS) data of a vehicle related to a specific driving situation of the vehicle, location data of the vehicle, driving data of the vehicle, and a driving image captured during driving of the vehicle from a vehicle terminal device; generating guidance information related to the specific driving situation of the vehicle by analyzing the received data and the driving image; and providing a driving related guidance service for the vehicle using the generated guidance information.

In the generating, accident situation prediction information on an accident situation which might have occurred in the first driving situation may be generated by analyzing the ADAS data, the location data, the driving data, and the driving image before a point in time of a first driving situation in which an accident did not occur while the vehicle was moving but which involved an accident likelihood, and in the providing, an accident situation prediction guidance service may be provided using the generated accident situation prediction information.

In the generating, an accident legal evaluation information may be generated by analyzing the ADAS data, the location data, the driving data, and the driving image before and after a predetermined period of time from a point in time of the second driving situation at which an accident occurred in the vehicle, and in the providing, an accident legal guidance service may be provided using the generated accident legal evaluation information.

The received driving image may be a top-view image in which a front driving image and a rear driving image are combined and in which a host vehicle object is placed at a location of a host vehicle in the combined image.

The generating of the accident situation prediction information may include detecting a neighbor vehicle of the host vehicle from the top-view image; and predicting an accident situation which might have occurred in the vehicle in the first driving situation using at least one of ADAS data and driving data of the host vehicle for the detected vehicle and generating the accident situation prediction information.

The generating of the accident legal evaluation information may include: detecting a neighbor vehicle of the host vehicle from the top-view image; analyzing an accident negligence rate using at least one of the ADAS data and the driving data of the host vehicle for the detected vehicle; and generating the accident legal evaluation information including the accident negligence rate according to the analysis.

The method may further include: storing a destination data set for each parking location for a driver of the vehicle; determining an expected destination of the vehicle driver by comparing location data of the vehicle with the previously stored destination data set for each parking location when the vehicle is switched from parking to a driving state; and providing a destination prediction guidance service using the determined expected destination.

The method may further include: storing a ADAS data set for each driving location for the vehicle driver; detecting ADAS data corresponding to a location of the vehicle driver by comparing the location data of the vehicle with the previously stored ADAS data set for each driving location; and providing the driver's past driving history guidance service using the detected ADAS data.

The method may further include: storing an ADAS data set for each driving location for another driver; detecting ADAS data corresponding to a location of the vehicle driver by comparing the location data of the vehicle with the previously stored ADAS data set for each driving location; and providing the other driver's past driving history guidance service using the detected ADAS data.

According to another aspect of the present invention, a vehicle terminal device may include: a communication unit; an image acquisition unit acquiring a driving image captured during driving of a vehicle; an advanced driver assistance system (ADAS) data acquisition unit receiving ADAS data from an ADAS module which assists driving of the vehicle; an electronic control unit (ECU) data acquisition unit receiving driving data of the vehicle from an ECU module of the vehicle; a location data acquisition unit receiving location data of the vehicle; and a controller controlling the communication unit to transmit the ADAS data related to a specific driving situation detected during driving of the vehicle, the location data, the driving data of the vehicle, and the driving image to a service server.

According to another aspect of the present invention, a service server may include: a communication unit receiving an advanced driver assistance system (ADAS) data of a vehicle related to a specific driving situation of the vehicle, location data of the vehicle, driving data of the vehicle, and a driving image captured during driving of the vehicle from a vehicle terminal device; and a service providing unit generating guidance information related to the specific driving situation of the vehicle by analyzing the received data and the driving image, and providing a driving related guidance service for the vehicle using the generated guidance information.

According to another aspect of the present invention, a program stored in a recording medium to execute a method for providing a driving related guidance service may be provided.

According to another aspect of the present invention, a computer readable recording medium in which a program code for executing a method for providing a driving related guidance service is recorded may be provided.

According to various exemplary embodiments of the present invention described above, an accident situation prediction service is provided by predicting an accident situation that may occur in a vehicle in a first driving situation with an accident likelihood of the vehicle and generating accident situation prediction information, thereby reminding the driver about a risk and promoting the driver's safe driving.

In addition, according to various exemplary embodiments of the present invention, an accident legal guidance service is provided by analyzing details of an accident in a second driving situation in which a vehicle accident occurred and generating accident legal evaluation information including an accident negligence rate according to the analysis, whereby legal services of financial factors such as vehicle repair costs and advice related to insurance may be supported to increase the driver's convenience.

In addition, according to various exemplary embodiments of the present disclosure, a driver's convenience may be improved through a destination prediction guidance service, a driver's past driving history guidance service, and another driver's past driving history guidance service.

DETAILED DESCRIPTION

Figure 1:
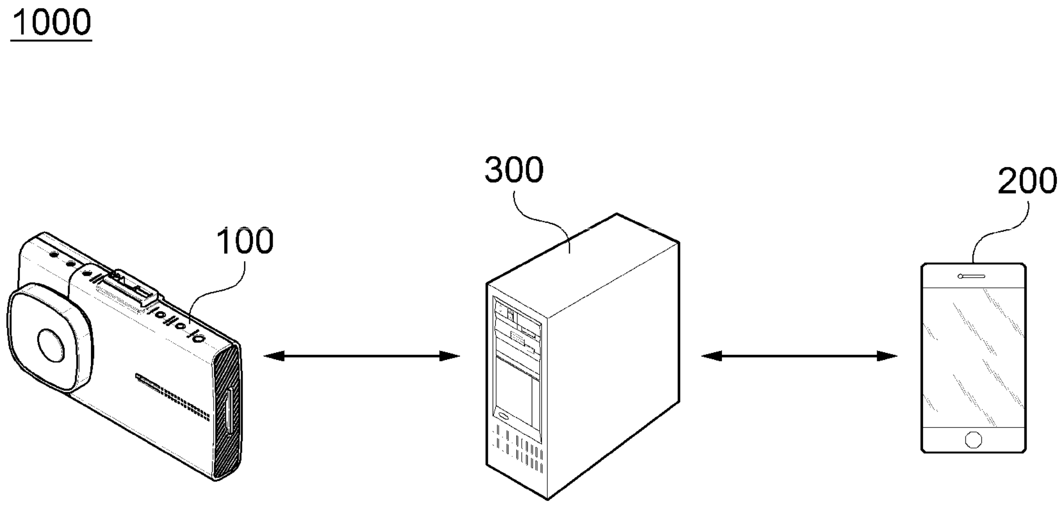
FIG. 1 is a block diagram showing a service providing system according to an exemplary embodiment of the present invention.

The following description illustrates only a principle of the present invention. Therefore, those skilled in the art may implement the principle of the present invention and devise various apparatuses included in the spirit and scope of the present invention although not clearly described or shown in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all devices devised to perform the same function regardless of a structure.

Therefore, it is to be understood that, for example, a block diagram of the present specification shows a conceptual aspect of an illustrative circuit for embodying a principle of the present invention. Similarly, it is to be understood that all flowcharts, state transition views, pseudo-codes, and the like show various processes that may tangibly embodied in a computer-readable medium and that are executed by computers or processors regardless of whether the computers or the processors are clearly illustrated.

Functions of various devices including processors or functional blocks represented as concepts similar to the processors and illustrated in the accompanying drawings may be provided by hardware having a capability to execute appropriate software as well as dedicated hardware. When the functions are provided by the processors, the above-mentioned functions may be provided by a single dedicated processor, a single shared processor, or a plurality of individual processors, in which some of them may be shared.

In addition, terms mentioned as a processor, a control, or a concept similar to the processor or the control should not be interpreted to exclusively cite hardware having capability to execute software, but should be interpreted to implicitly include digital signal processor (DSP) hardware and a read only memory (ROM), a random access memory (RAM), and a non-volatile memory for storing software without being limited thereto. The above-mentioned terms may also include other well-known hardware.

In the claims of the present specification, components represented as means for performing functions mentioned in a detailed description are intended to include all methods for performing functions including all types of software including, for example, a combination of circuit devices performing these functions, firmware/micro codes, or the like, and are coupled to appropriate circuits for executing the software. It is to be understood that since functions provided by variously mentioned means are combined with each other and are combined with a scheme demanded by the claims in the inventions, any means capable of providing these functions are equivalent to means recognized from the present specification.

The above-mentioned objects, features, and advantages will become obvious from the following detailed description provided in relation to the accompanying drawings. Therefore, those skilled in the art to which the present invention pertains may easily practice a technical idea of the present invention. Further, in describing the present invention, if it is judged that a detailed description of a well-known technology associated with the present invention may unnecessarily make unclear the gist of the present invention, it will be omitted.

Hereinafter, various exemplary embodiments of the present invention will be described in detail with reference to the accompanying drawings.

Figure 2:
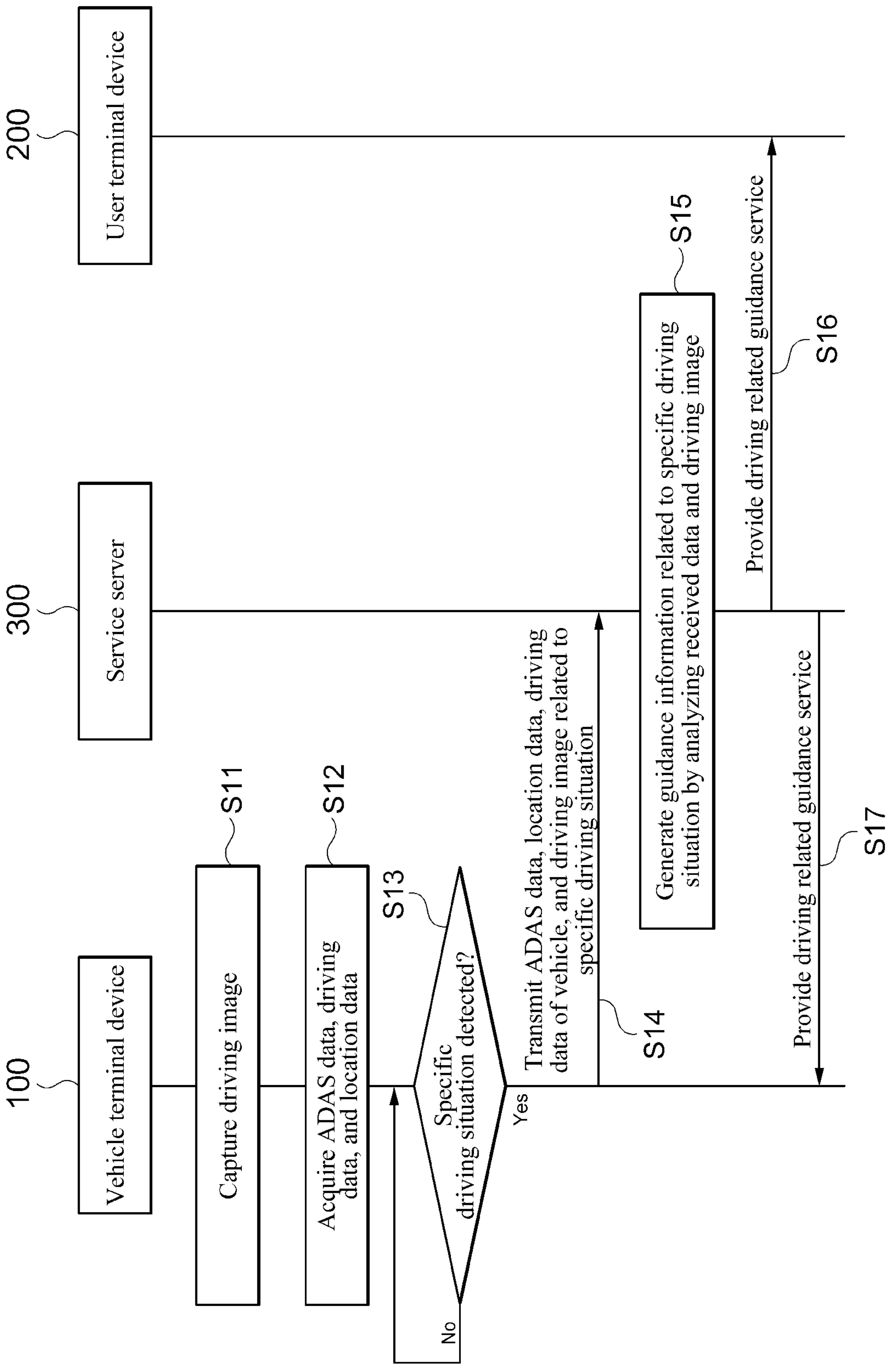
FIG. 2 is a timing diagram showing an operation of a service providing system according to an exemplary embodiment of the present invention.

FIG. 1 is a block diagram showing a service providing system according to an exemplary embodiment of the present invention. FIG. 2 is a timing diagram illustrating an operation of a driving related guidance system according to an exemplary embodiment of the present invention. Referring to FIGS. 1 to 2, a service providing system 1000 according to an exemplary embodiment of the present invention includes all or some of a vehicle terminal device 100, a user terminal device 200, and a service server 300.

A vehicle terminal device 100 may be provided in a vehicle to collect various data necessary for providing a driving related guidance service according to the present invention, perform pre-processing, analysis, etc., on the collected data, transmit the collected data or processed data to a service server 300, and provide various driving related guidance by interworking with the service server 300.

Specifically, the vehicle terminal device 100 acquires a driving image captured during driving of the vehicle (i.e., while the vehicle is moving) (S11), receives advanced driver assistance system (ADAS) data from an ADAS module that assists driving of the vehicle, receive driving data from an electronic control unit (ECU) on-board diagnostics (OBD) module of the vehicle, and receive location data acquired through a location data acquisition unit 150 (S12). In addition, when a specific driving situation is detected during driving of the vehicle (S13:Y), the vehicle terminal device 100 may transmit ADAS data, location data, driving data, and a driving image related to the detected specific driving situation to the service server 300 (S14).

The vehicle terminal device 100 may be implemented with various devices such as a navigation device or a car dash cam or a car video recorder, which is a vehicle imaging device. However, the vehicle terminal device 100 is not limited thereto and may be implemented as a communication dongle that relays ADAS data, driving data, location data, and a driving image acquired from various vehicle devices to the service server 300.

The aforementioned expression of "the vehicle is moving" refers to a state in which the vehicle is being driven by an autonomous driving system or by a person and may have a concept including various types such as a stopped state of the vehicle, a driving state of the vehicle, and a parking state of the vehicle.

In addition, the specific driving situation of the vehicle described above may include a first driving situation in which an accident did not occur during driving of the vehicle but which involved an accident likelihood and a second driving situation in which an accident has occurred during driving of the vehicle.

In addition, the vehicle is a concept including a transporter capable of moving living organisms using power and may be a concept including all transport machinery such as a railroad vehicle running on a track and a vehicle, a motorcycle, a bicycle, etc., driving on the road.

Meanwhile, the service server 300 may receive ADAS data, location data, driving data, and a driving image related to the specific driving situation of the vehicle from the vehicle terminal device 100, analyze the received data and the driving image, and generate guidance information related to the specific driving situation of the vehicle (S15). For example, the service server 300 may analyze the data and the driving image received from the vehicle terminal device 100 and generate accident situation prediction information on an accident situation that may have occurred in the vehicle in the first driving situation. Alternatively, the service server 300 may analyze the data and the driving image received from the vehicle terminal device 100 and generate accident legal evaluation information based on details of an accident of the vehicle.

Also, the service server 300 may provide a driving related guidance service for the vehicle using the generated guidance information. Specifically, the service server 300 may provide the driving related guidance service for the vehicle to the vehicle terminal device 100 by transmitting the generated guidance information to the vehicle terminal device 100. In addition, the service server 300 may provide the driving related guidance service for a vehicle to the user terminal device 200 by transmitting the generated guidance information to the user terminal device 200.

In this case, the vehicle terminal device 100 and the user terminal device 200 may provide driving related guidance through a sound or a screen using the guidance information received from the service server 300.

Here, the user terminal device 200 is a device of a person who needs guidance related to driving of a vehicle, such as a driver or a passenger of a vehicle, and the user terminal device 200 may be implemented as various devices such as a smartphone, a tablet computer, a notebook computer, a personal digital assistant (PDA), a portable multimedia player (PMP), smart glasses, project glasses, a navigation device, or the like.

The service providing system 1000 according to the present invention may provide a service related to driving of the vehicle using at least one of ADAS data, location data, driving data, and a driving image received from the vehicle terminal device 100.

Hereinafter, each of the constituent modules constituting the service providing system 1000 according to an exemplary embodiment of the present invention will be described in more detail with reference to the accompanying drawings.

Figure 3:
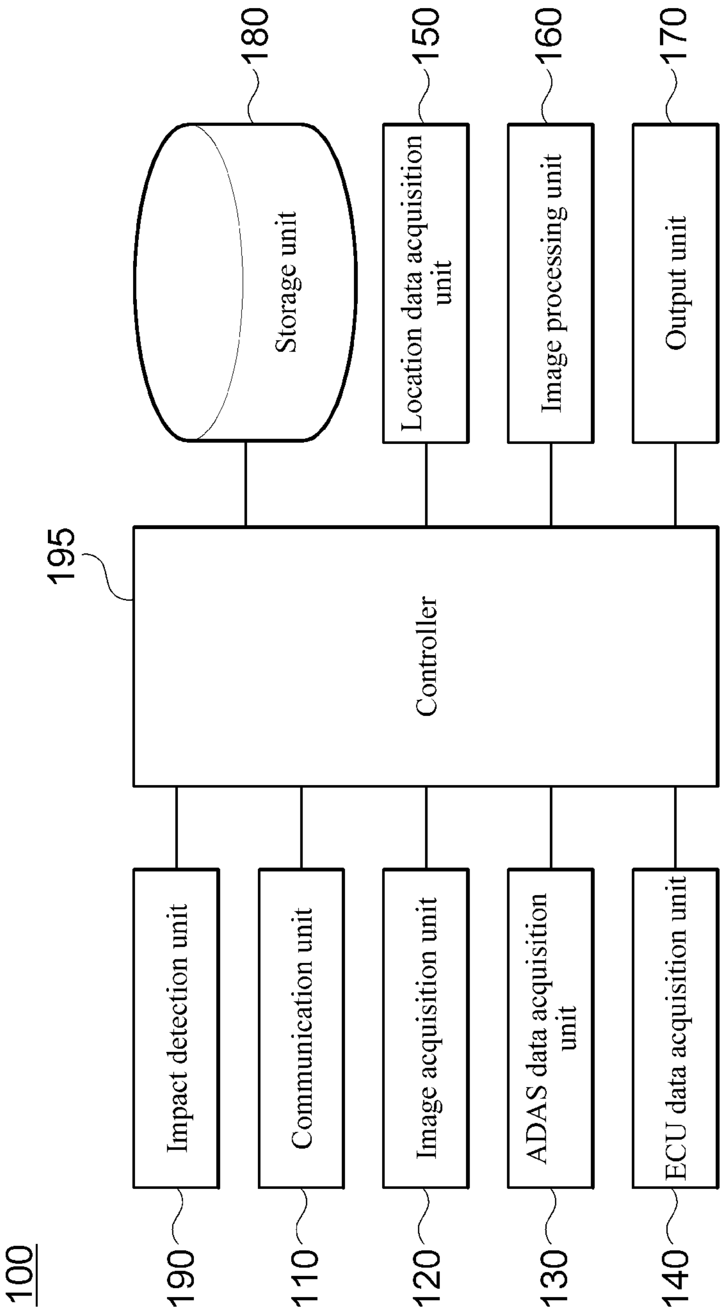
FIG. 3 is a block diagram showing a vehicle terminal device according to an exemplary embodiment of the present invention.

FIG. 3 is a block diagram of a vehicle terminal device according to an exemplary embodiment of the present invention. Referring to FIG. 3, the vehicle terminal device 100 according to an exemplary embodiment of the present invention includes all or some of a communication unit 110, an image acquisition unit 120, an ADAS data acquisition unit 130, an ECU data acquisition unit 140, and a location data acquisition unit 150, an image processing unit 160, an output unit 170, a storage unit 180, an impact detection unit 190, and a controller 195.

The communication unit 110 may perform communication between the vehicle terminal device 100 and other devices. Specifically, the communication unit 110 may perform a function of transmitting and receiving data by communicating with all or some of the service server 300, the user terminal device 200, and the vehicle terminal device provided in another vehicle.

In particular, the communication unit 110 may transmit a driving image, ADAS data, driving data, and location data acquired during driving of the vehicle to the service server 300, and the service server 300 may generate guidance information related to driving of the vehicle based on the data received from the vehicle terminal device 100. Further, the communication unit 110 may receive driving related guidance information of the vehicle generated in the service server 300.

Here, the communication unit 110 may be implemented using various communication methods such as a type that is connected in a wireless or wired manner through a local area network (LAN) and the Internet, a type connected through a universal serial bus (USB) port, a type that is connected through a mobile communication network such as 3G and 4G, a type that is connected through a short-range wireless communication method such as near field communication (NFC), radio frequency identification (RFID), and Wi-Fi.

The image acquisition unit 120 may acquire an image captured during driving of the vehicle. As an example, if the vehicle terminal device 100 is a device having an image capturing function, the image acquisition unit 120 may be a camera that performs image capturing. As another example, when the vehicle terminal device 100 is a communication dongle, the image acquisition unit 120 may be implemented as a module that receives an image captured by an external camera.

In this way, the vehicle driving image acquired by the image acquisition unit 120 may include numerous objects located in a real world environment in which the vehicle is moving, for example, vehicles, people, animals, bridges, buildings, roadways, sidewalks, roadway guidance signs, crosswalks, intersections, traffic lights, center dividers, bus stops, trees, etc.

For example, the captured image of a roadway may include a plurality of lanes separated according to lane markings, a roadway including a plurality of lanes, and a plurality of vehicles running on the roadway. In addition, the driving image may include a roadway guidance sign depending on the roadway in which the vehicle is moving. Here, the lane marking may refer to each of both lines forming a lane in which the vehicle is located. Further, the lane is formed by the lane markings such as a primary lane, a secondary lane, or an N lane, and may refer to a roadway in which a vehicle travels.

The vehicle driving image may include a front image captured by a front camera and a rear image captured by a rear camera. In addition, the vehicle driving image may further include a left image captured by a left camera and a right image captured by a right camera.

The vehicle driving image acquired by the image acquisition unit 120 may be transmitted to the image processing unit 160 for image processing.

The ADAS data acquisition unit 130 may receive ADAS data of a vehicle from the ADAS module. Here, ADAS may include a forward vehicle start alert (FVSA) that guides or warns of departure of a preceding vehicle located in front of the vehicle, a forward collision warning system (FCWS) that informs or warns of a possibility of a collision with the preceding vehicle located in front of the vehicle, a lane departure warning system (LDWS) that informs or warns that the vehicle is deviating from a lane marking, a curve speed warning system (CSWS) that informs or warns of a sharp curve in front of the vehicle, a sudden stop notification system that informs or warns that the vehicle has suddenly stopped, a sudden turn notification system that informs or warns that the vehicle has turned sharply, a blind spot detection (BSD) system that informs or warns of another vehicle present in a driver's blind spot. In addition, ADAS may include an over-speed spot crackdown guidance, autonomous emergency braking (AEB) system, a lane keep assist system (LKAS) that maintains a lane by adjusting a driving direction in case of lane departure, advanced smart cruise control (ASCC) that maintains a distance to a preceding vehicle, while moving at a set speed, an around view monitor (AVM) system which visually shows a situation around the vehicle, a driver attention warning (DAW) provided when a driving pattern is determined to be careless by analyzing vehicle signals such as a steering angle or a steering torque of the vehicle and a driving pattern of a vehicle driver such as a location of the vehicle in a lane, and the like. However, the example of ADAS is not limited to the aforementioned example, and the ADAS according to the present invention is a concept including all driver assistance functions to assist the driver's safe driving in numerous driving environments that the vehicle driver may encounter while driving.

Meanwhile, when at least one of the plurality of ADAS functions described above is executed during driving of the vehicle, the ADAS data acquisition unit 130 may acquire ADAS identification data executed from the ADAS module and data detected in the process of executing the corresponding ADAS. As an example, when the FCWS function among ADAS functions is executed during driving of the vehicle, the ADAS data acquisition unit 130 may acquire ADAS identification data indicating that the executed function is FCWS and data (e.g., distance to the preceding vehicle) detected in the process of executing the FCWS.

The ECU data acquisition unit 140 may receive driving data of the vehicle from an electronic control unit (ECU) module of the vehicle. Here, the ECU refers to an electronic control device that controls a state of an engine, an automatic transmission, an ABS, etc., of the vehicle by a computer. Specifically, the ECU data acquisition unit 140 may be connected to an OBD terminal coupled to the ECU of the vehicle, periodically perform polling using an OBD communication protocol in the connection between the ECU data acquisition unit 140 and the ECU through the OBD interface, and acquire driving data of the vehicle from the ECU.

Here, the driving data of the vehicle may include data of a change in a start ON/OFF state of the vehicle, speed data of the vehicle, a steering angle of a vehicle steering device, steering torque data, fuel data of the vehicle, and the like.

The location data acquisition unit 150 is a device that acquires location data through a global navigation satellite system (GNSS). The GNSS refers to a navigation system capable of calculating a location of a receiving terminal using radio signals received from satellites. Specific examples of the GNSS include a global positioning system (GPS), Galileo, a global orbiting navigational satellite system (GLONASS), COMPASS, an Indian regional navigational satellite system (IRNSS), a quasi-zenith satellite system (QZSS), etc. The location data acquisition unit 150 according to an exemplary embodiment of the present invention may acquire location data by receiving a GNSS signal provided in an area where the vehicle terminal device 100 is used. Alternatively, the location data acquisition unit 150 may acquire location data through communication with a base station or an access point (AP) in addition to the GNSS.

The image processing unit 160 may process the driving image of the vehicle acquired by the image acquisition unit 120. Specifically, the image processing unit 160 may perform compression processing of image data. As an example, the driving image of the vehicle acquired by the image acquisition unit 120 is a continuously captured image composed of a plurality of frames along a time axis, and a capacity of such an image is very large when not compressed, and it is very inefficient to store the image as it is in a memory, and thus, the digitally converted image should be compressed. Accordingly, the image processing unit 160 may perform compression processing based on a method using a correlation between frames, a spatial correlation, and a visual characteristic sensitive to a low frequency component.

In addition, the image processing unit 160 may combine a front driving image and a rear driving image acquired through the image acquisition unit 120, and generate a top-view image in which a host vehicle object (or own vehicle object) is disposed at a location of a host vehicle in the combined image. The top-view image may be transmitted to the service server 300, and the top-view image transmitted to the service server 300 may be analyzed together with at least one of the ADAS data, the driving data, and the location data so as to be used to generate an accident situation prediction information, legal evaluation information, and the like.

Here, the top-view image may have, for example, a graphics interchange format (GIF) formed by extracting a plurality of frames. That is, even if the driving image is compressed through the image acquisition unit 120, a data size may be large in the case of transmitting video to a server, and thus, according to the present invention, dynamic information is included for the accident situation prediction information, the legal evaluation information, and the like but, in order to achieve the purpose with a minimum data size, the image processing unit 160 may generate the driving image in a GIF format and transmit the image to the service server 300.

According to the aforementioned example, the operation of generating the top-view image is performed in the image processing unit 160 of the vehicle terminal device 100 but the present invention is not limited thereto. According to another exemplary embodiment of the present invention, the vehicle terminal device 100 may be implemented to transmit the captured driving image to the service server 300, and the service server 300 may be implemented to recombine the driving image received from the vehicle terminal device 100 to generate the top-view image.

Meanwhile, the output unit 170 is a unit that outputs the data of the vehicle terminal device 100 to a user as an image and/or sound. Here, the output unit 170 may include all or some of a display unit (not shown) and an audio output unit (not shown).

The display unit is a unit that outputs data that may be visually recognized by the user. The display unit may be implemented as a display unit provided on a front of a housing of the vehicle terminal device 100. In addition, the display unit may be integrally formed with the vehicle terminal device 100 to output visual recognition data or may be installed separately from the system 100 such as a head up display (HUD) to output visual recognition data.

The audio output unit is a unit that outputs data that may be audibly recognized by the vehicle terminal device 100. The audio output unit may be implemented as a speaker that expresses data that the user of the vehicle terminal is informed of as sound.

The storage unit 180 serves to store various data and applications required for the operation of the vehicle terminal device 100. In particular, the storage unit 180 may store data, for example, an OS, a route search application, map data, and the like necessary for the operation of the vehicle terminal device 100. In addition, the storage unit 180 may sort and store a driving image, ADAS data, driving data, and location data generated by the operation of the vehicle terminal device 100 by time or location.

The storage units 180 may be implemented not only as an internal storage element such as a random access memory (RAM), a flash memory, a read-only memory (ROM), an erasable programmable ROM (EPROM), an electronically erasable and programmable (EEPROM), a register, a hard disk, a removable disk, a memory card, a universal subscriber identity module (USIM) but also as a removable storage such as a USB memory.

Meanwhile, the impact detection unit 190 may detect an impact during driving of the vehicle and output an impact level value corresponding to the detected impact to the controller 195. Here, the impact detection unit 190 may be implemented by, for example, an acceleration sensor.

The controller 195 may control the overall operation of the vehicle terminal device 100. Specifically, the controller 195 may control all or some of the communication unit 110, the image acquisition unit 120, the ADAS data acquisition unit 130, the ECU data acquisition unit 140, the location data acquisition unit 150, the image processing unit 160, the output unit 170, the storage unit 180, and the impact detection unit 190.

In particular, the controller 195 may provide a driving related guidance service of a vehicle in connection with the service server 300. Here, the driving related guidance service of the vehicle includes at least one of an accident situation prediction guidance service, an accident legal guidance service, a vehicle driver's destination prediction guidance service, a vehicle driver's past driving history guidance service, and another driver's past driving history guidance service.

Specifically, the controller 195 may detect a specific driving situation during driving of the vehicle and control the communication unit 110 to transmit ADAS data, location data, driving data, and a driving image related to the detected specific driving situation to the service server. Here, the specific driving situation may include a first driving situation in which an accident did not occur while the vehicle was moving but which involved an accident likelihood, and a second driving situation in which an accident occurred during driving of the vehicle.

Specifically, the controller 195 may receive an impact level value from the impact detection unit 190 during driving of the vehicle, and when an impact which exceeds a preset first impact level and which is less than a second impact level is detected and when at least one of a lane change notification, a forward collision notification, a sharp curve notification, a sudden stop notification, a sudden turn notification, and a blind spot notification is detected based on the ADAS data before the impact is detected, the controller may determine the first driving situation which involves an accident likelihood. Here, the second impact level is a threshold value of an impact level at which the vehicle may be determined as an accident, and may be a value calculated by digitizing various experimental data.

That is, if the driver does not detect another vehicle moving in a next lane while driving and finds the other vehicle while changing lanes and stops suddenly, it may be a situation which involved an accident likelihood even if the vehicle driven by the driver did not have an actual accident. In this case, since no actual accident has occurred, the impact detection unit 190 may detect the impact level exceeding the first impact level and less than the preset second impact level and ADAS data acquired by the ADAS data acquisition unit 130 includes lane change notification data, blind spot notification data, and sudden stop notification data.

Alternatively, when the driver does not recognize a preceding vehicle in front of the vehicle during driving and finds the preceding vehicle in front of the vehicle and makes a sudden stop, it may be a situation which involved an accident likelihood even if the vehicle driven by the driver did not have an actual accident. In this case, since no actual accident has occurred, the impact detection unit 190 may detect the impact level exceeding the first impact level and less than the preset second impact level and ADAS data acquired by the ADAS data acquisition unit 130 includes the forward collision notification data and sudden stop notification data.

Alternatively, if the driver does not recognize a sharp curve and travels at a high speed and finds the sharp curve and makes a sudden deceleration, it may be a situation which involved an accident likelihood even if the vehicle driven by the driver did not have an actual accident. In this case, since no actual accident has occurred, the impact detection unit 190 may detect the impact level exceeding the first impact level and less than the preset second impact level and ADAS data acquired by the ADAS data acquisition unit 130 includes sharp curve notification data.

In this way, when an impact level value within a predetermined level range is detected by the impact detection unit 190 during driving of the vehicle and at least one of a lane change notification, a forward collision notification, a sharp curve notification, a sudden stop notification, a sudden turn notification, and a blind spot notification is detected based on the ADAS data, the controller 195 may determine the first driving situation which involved an accident likelihood.

However, when an impact exceeding the preset second impact level is detected by the impact detection unit 190, the controller 195 may determine the second driving situation in which the accident has occurred.

Meanwhile, when the first driving situation in which an accident did not occur while the vehicle was moving but which involved an accident likelihood is detected, the controller 195 may control the communication unit 110 to transmit ADAS data, location data, driving data, and a driving image before a point in time of the detected first driving situation to the service server 300. In this case, the service server 300 may generate accident situation prediction information on an accident situation that might have occurred in the vehicle in the first driving situation by analyzing the data and the driving image received from the vehicle terminal device 100 in the first driving situation of the vehicle.

In addition, the service server 300 may collect driving images, driving data, ADAS data, location data, and accident data for each driving situation from each vehicle and perform learning through machine learning or deep learning based on the collected data to construct an accident likelihood prediction model. In addition, the service server 300 may predict an accident likelihood for each driving situation and each road section through the constructed accident likelihood prediction model, generate accident situation prediction information including an accident likelihood, and provide the generated accident situation prediction information to vehicles that satisfy conditions (vehicle speed, driver's driving habit, driving information of neighbor vehicles, road condition information of a road on which a vehicle is moving or a load located in a driving route of the vehicle, etc.) of a predicted result. Accordingly, the service server 300 according to an exemplary embodiment of the present invention may receive various driving related data such as driving images, driving data, ADAS data, location data, accident data, road condition information, etc. from vehicles moving on the entire road through communication such as vehicle to vehicle (V2V), vehicle to infrastructure (V2I), vehicle to everything (V2X), etc., predict an accident likelihood through learning such as machine learning, deep learning, etc., and provide information on a high accident likelihood to a vehicle expected to satisfy a specific condition.

Here, the accident situation prediction information generated by the service server 300 may be used to provide an accident situation prediction guidance service. Specifically, the service server 300 may transmit the generated accident situation prediction information to the vehicle terminal device 100 or the user terminal device 200, and the vehicle terminal device 100 or the user terminal device 200 may perform guidance based on the accident situation prediction information. For example, if the driver does not detect another vehicle moving in a next lane while driving and finds the other vehicle while changing lanes and stops suddenly, the service server 300 may generate accident situation prediction information such as "Left rear collision could have occurred after about 3 seconds" through an analysis and the vehicle terminal device 100 or the user terminal device 200 may perform guidance based on the generated accident situation prediction information.

In addition, when a second driving situation in which an accident occurred during driving the vehicle is detected, the controller 195 may control the communication unit 110 to transmit ADAS data, location data, driving data, and a driving image before or after a predetermined period of time from a point in time of the detected second driving situation. In this case, the service server 300 may generate accident legal evaluation information based on details of the accident of the vehicle in the second driving situation by analyzing the data and the driving image received from the vehicle terminal device 100 in the second driving situation of the vehicle.

Here, the accident legal evaluation information generated by the service server 300 may be used to provide an accident legal guidance service. Specifically, the service server 300 may transmit the generated accident legal evaluation information to the vehicle terminal device 100 or the user terminal device 200, and the vehicle terminal device 100 or the user terminal device 200 may perform guidance based on the accident legal evaluation information. For example, in the event of an accident, the service server 300 may generate accident legal evaluation information such as "Fault rate of the host vehicle is 30% and fault rate of the other vehicle is 70%" through analysis, and the vehicle terminal device 100 or the user terminal device 200 may perform guidance based on the generated accident legal evaluation information.

That is, according to the present invention, the data transmitted to the service server 300 may be set to be different according to whether a driving situation of the vehicle is the first driving situation which involved a danger of accident or the second driving situation in which an accident has occurred, and a driving related guidance service according to each situation may be controlled to be provided.

Meanwhile, when an expected destination of the vehicle driver is determined according to a change in a state of the vehicle from parking to driving in the service server 300, the vehicle terminal device 100 according to an exemplary embodiment of the present invention may provide a destination prediction guidance of the vehicle driver. For example, when the state of the vehicle is changed from parking to driving, the service server 300 may generate destination prediction information such as "Expected destination of vehicle at a current parking location is the office (work)" through analysis, and the vehicle terminal device 100 or the user terminal device 200 may perform guidance based on the generated destination prediction information.

In addition, when the service server compares location data of the vehicle with the previously stored ADAS data set for each driving location and detects ADAS data corresponding to a location of the vehicle driver, the vehicle terminal device 100 according to an exemplary embodiment of the present invention may provide the vehicle driver's past driving history guidance. For example, when ADAS data corresponding to the location of the vehicle driver is detected, the service server 300 may generate driver's past driving history information such as "Current location is the location where a blind spot notification was performed" through analysis, and the vehicle terminal device 100 or the user terminal device 200 may perform guidance based on the generated information.

In addition, when the service server 300 compares location data of the vehicle with the previously stored ADAS data set for each driving location for another driver and detects ADAS data of the other driver corresponding to a location of the vehicle driver, the vehicle terminal device 100 according to an exemplary embodiment of the present invention may provide the other driver's past driving history guidance. As an example, when ADAS data of the other driver corresponding to the location of the vehicle driver is detected, the service server 300 may generate the other driver's past driving history information such as "Current location is the location where a sharp curve notification was performed from a number of drivers" through analysis, and the vehicle terminal device 100 or the user terminal device 200 may perform guidance based on the generated information.

Hereinafter, a method for providing a driving related guidance service of the vehicle terminal device 100 according to an exemplary embodiment of the present invention will be described in more detail with reference to FIGS. 4 and 5.

Figure 4:
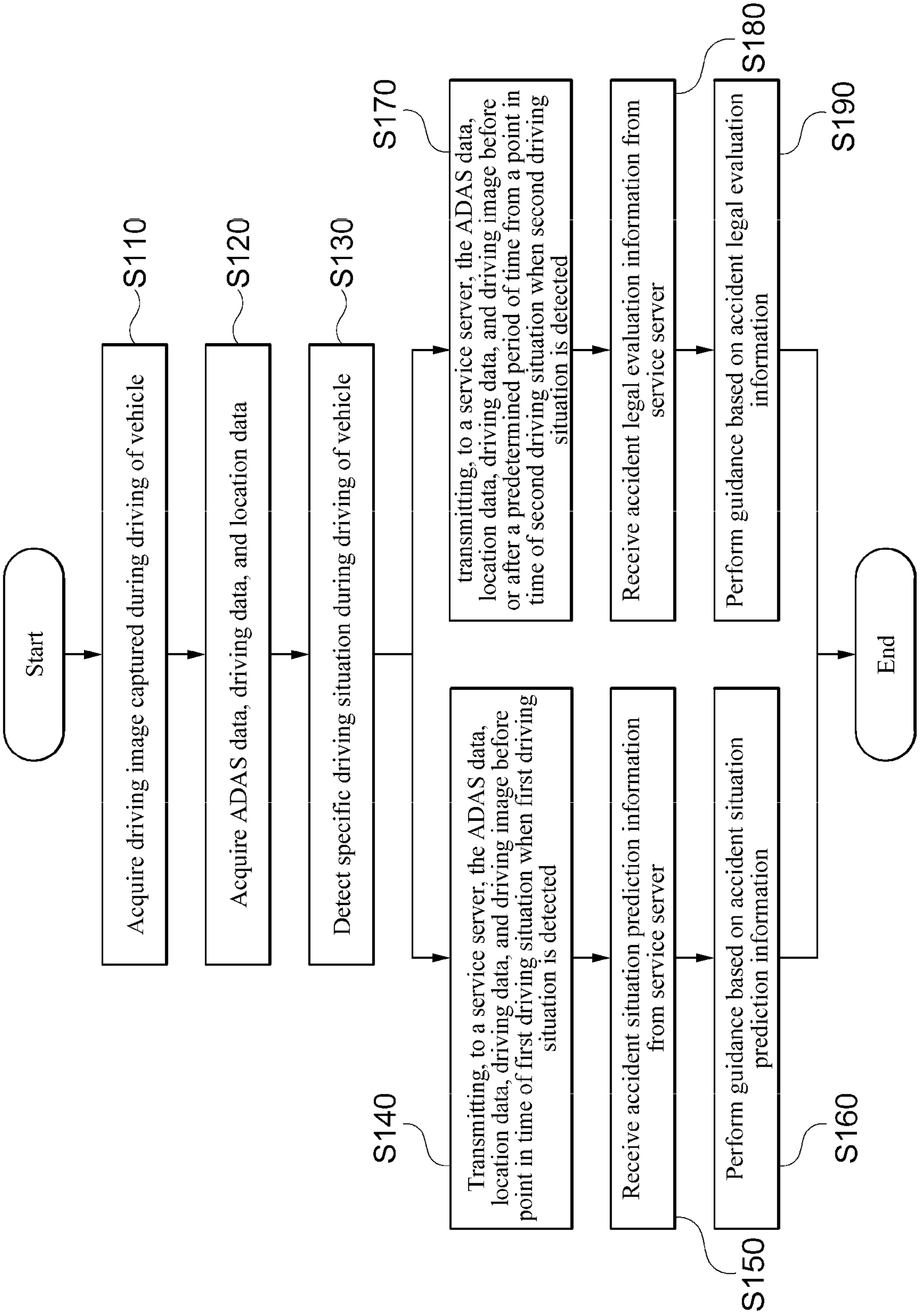
FIG. 4 is a flowchart illustrating a method for providing a driving related guidance service of a vehicle terminal device according to an exemplary embodiment of the present invention.

FIG. 4 is a flowchart illustrating a method for providing a driving related guidance service of a vehicle terminal device according to an exemplary embodiment of the present invention. Referring to FIG. 4, first, the vehicle terminal device 100 may acquire a driving image captured during driving of the vehicle (S110).

The vehicle terminal device 100 may receive ADAS data of the vehicle from an ADAS module that assists driving of the vehicle, receive driving data of the vehicle from an ECU module of the vehicle, and receive location data of the vehicle from the location data acquisition unit 150 (S120).

The vehicle terminal device 100 may detect a specific driving situation during driving of the vehicle (S130). If a first driving situation in which an accident did not occur while the vehicle was moving but which involved an accident likelihood is detected, the vehicle terminal device 100 may transmit ADAS data, location data, driving data, and a driving image before a point in time of the detected first driving situation to the service server 300 (S140).

Also, when the service server 300 generates accident situation prediction information on an accident situation that might have occurred in the vehicle based on the data and the driving image received from the vehicle terminal device 100, accident situation prediction information may be received from the service server 300 (S150).

In this case, the vehicle terminal device 100 may perform guidance based on the received accident situation prediction information (S160).

However, when a second driving situation in which an accident occurred during driving of the vehicle is detected, the vehicle terminal device 100 may transmit ADAS data, location data, driving data, and a driving image before or after a predetermined period of time from a point in time of the detected second driving situation to the service server 300 (S170).

Also, when the service server 300 generates accident legal evaluation information based on details of the accident based on the data and the driving image received from the vehicle terminal device 100, the accident legal evaluation information may be received from the service server 300 (S180).

In this case, the vehicle terminal device 100 may perform guidance based on the received accident legal evaluation information (S190).

Meanwhile, step (S110) of acquiring the driving image may include acquiring a front driving image captured by a front camera and a rear driving image captured by a rear camera. In this case, the method according to an exemplary embodiment of the present invention may further include combining the front driving image and the rear driving image and generating a top-view image in which a host vehicle object is placed at a location of the host vehicle in the combined image. Here, the generated top-view image may be transmitted to the service server 300 and used to generate accident situation prediction information and accident legal evaluation information. In addition, the top-view image may have a graphics interchange format (GIF) formed by extracting a plurality of frames.

Meanwhile, the method according to an exemplary embodiment of the present invention described above may further include performing a destination prediction guidance, a driver's past driving history guidance, another driver's past driving history guidance in connection with the service server 300.

Figure 5:
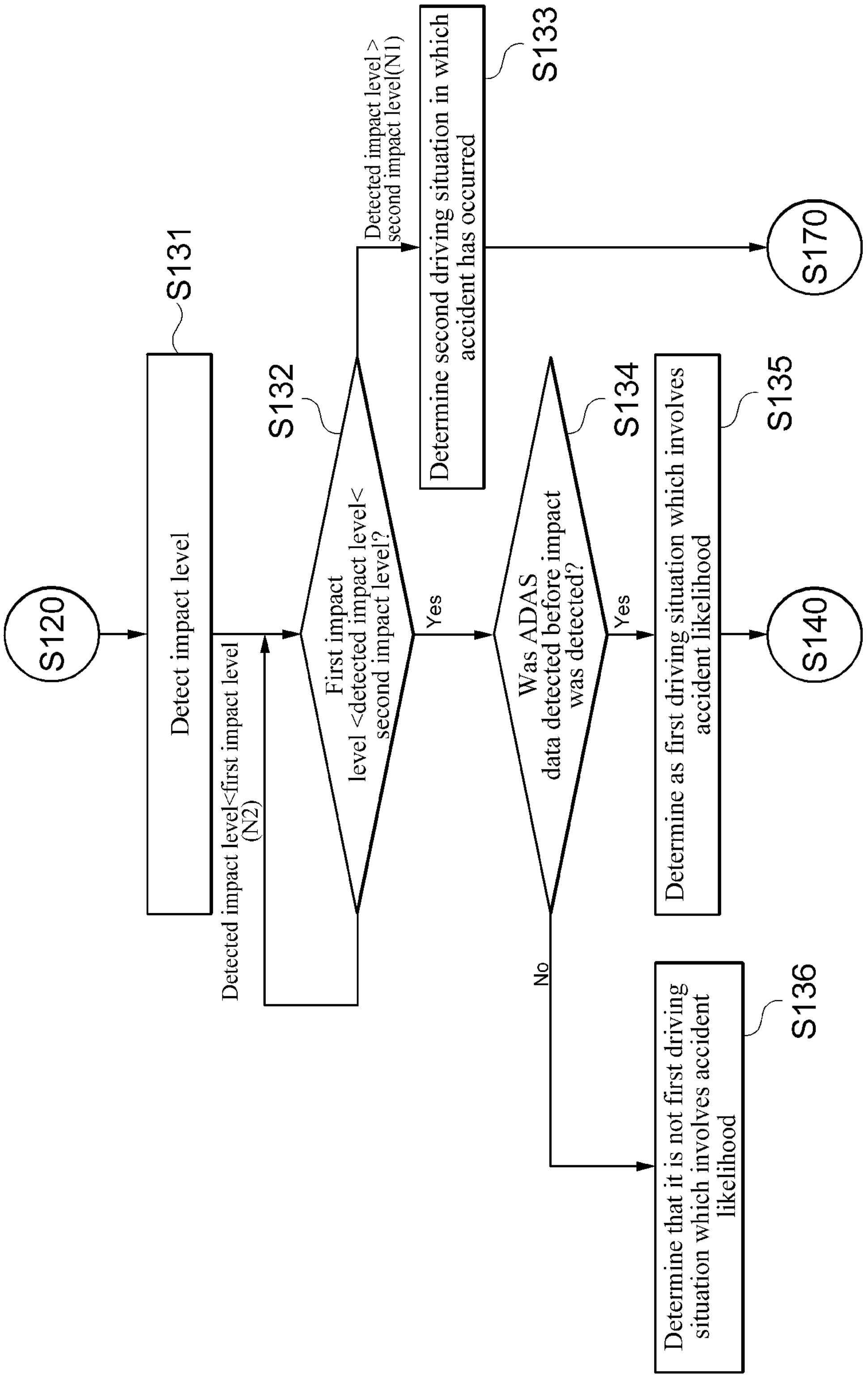
FIG. 5 is a flowchart illustrating a method for detecting a driving situation by a vehicle terminal device according to an exemplary embodiment of the present invention.

FIG. 5 is a flowchart illustrating a method for detecting a driving situation of a vehicle terminal device according to an exemplary embodiment of the present invention. Referring to FIG. 5, step S130 of detecting a specific driving situation during driving of a vehicle according to an exemplary embodiment of the present invention may include the following steps.

First, the vehicle terminal device 100 may detect an impact level (S131).

In addition, the vehicle terminal device 100 may determine whether the detected impact level exceeds a preset first impact level and is less than a preset second impact level (S132).

If the detected impact level exceeds the preset second impact level (S132:N1), the vehicle terminal device 100 may determine the second driving situation in which an accident has occurred (S133).

In addition, when the detected impact level is less than the preset first impact level (S132:N2), the vehicle terminal device 100 may determine that it is not a specific driving situation.

However, if the detected impact level exceeds the preset first impact level and is less than the preset second impact level (S132:Y), it may be determined whether at least one of a lane departure notification, forward collision, a sharp curve notification, a sudden stop notification, a sudden turn notification, and a blind spot notification is detected based on ADAS data before the impact is detected (S134).

If at least one of the lane departure notification, the forward collision, the sharp curve notification, the sudden stop notification, the sudden turn notification, and the blind spot notification is detected based on the ADAS data before the impact is detected (S134:Y), the vehicle terminal device 100 may determine the first driving situation which involves an accident likelihood (S135).

However, if at least one of the lane departure notification, the forward collision, the sharp curve notification, the sudden stop notification, the sudden turn notification, and the blind spot notification is not detected based on the ADAS data before the impact is detected (S134:N), the vehicle terminal device 100 may determine that it is not the first driving situation which involves an accident likelihood (S136).

Meanwhile, the aforementioned vehicle terminal device 100 may provide a driving related guidance service in connection with the service server 300. Hereinafter, the service server 300 according to an exemplary embodiment of the present invention will be described in more detail with reference to the accompanying drawings.

Figure 6:
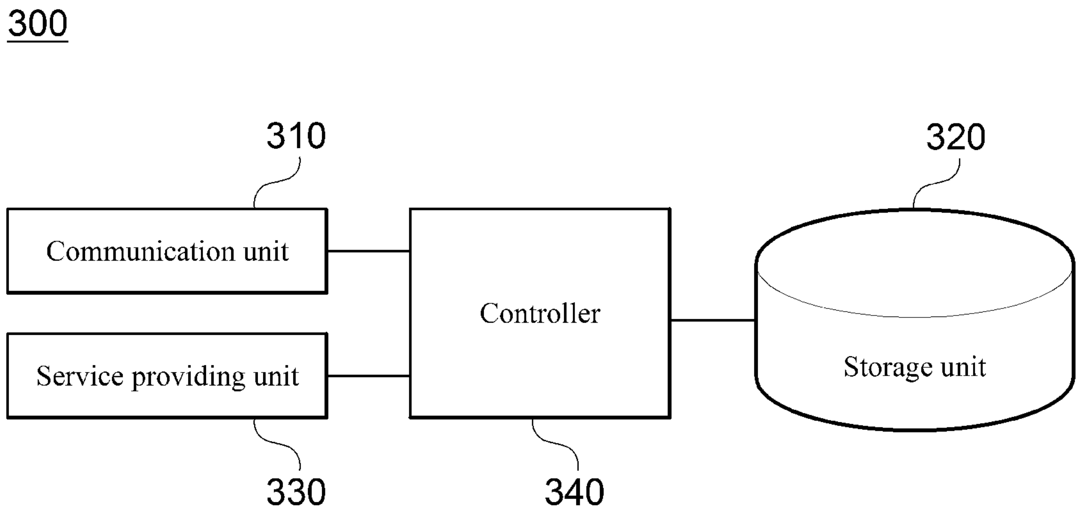
FIG. 6 is a block diagram showing a service server according to an exemplary embodiment of the present invention.
Figure 7:
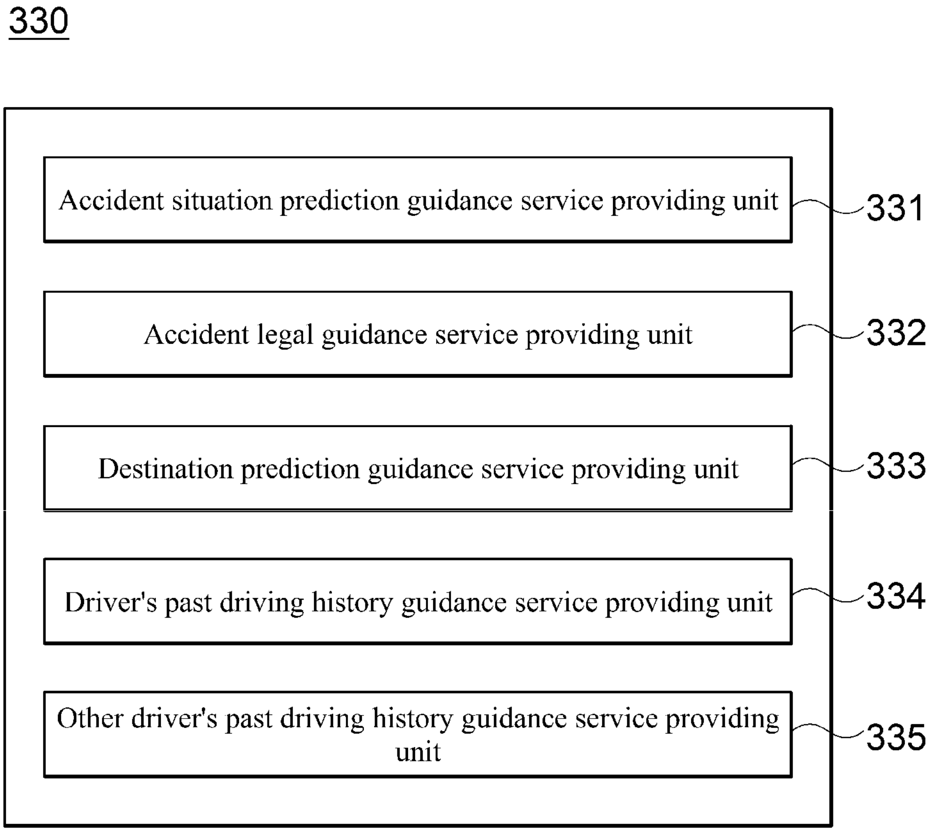
FIG. 7 is a block diagram specifically showing a service providing unit according to an exemplary embodiment of the present invention.

FIG. 6 is a block diagram showing a service server according to an exemplary embodiment of the present invention. FIG. 7 is a block diagram specifically showing the service providing unit 330 according to an exemplary embodiment of the present invention. Referring to FIGS. 6 and 7, the service server 300 according to an exemplary embodiment of the present invention may include all or some of a communication unit 310, a storage unit 320, a service providing unit 330, and a controller 340. In addition, the service providing unit 330 may include all or some of an accident situation prediction guidance service providing unit 331, an accident legal guidance service providing unit 332, a destination prediction guidance service providing unit 333, a driver's past driving history guidance service providing unit 334, and another driver's past driving history guidance service providing unit 335.

The communication unit 310 may perform communication between the service server 300 and other devices. Specifically, the communication unit 310 may perform a function of transmitting and receiving data by communicating with the vehicle terminal device 100 and the user terminal device 200.

In particular, the communication unit 310 may receive a driving image, ADAS data, driving data, and location data acquired during driving of the vehicle from the vehicle terminal device 100, and generate guidance information related to driving of the vehicle based on the data received from the vehicle terminal device 100. Also, the communication unit 310 may transmit the generated guidance information related to driving of the vehicle to the vehicle terminal device 100 and/or the user terminal device 200.

Here, the communication unit 310 may be implemented using various communication methods such as a type that is connected in a wireless or wired manner through a local area network (LAN) and the Internet, a type connected through a universal serial bus (USB) port, a type that is connected through a mobile communication network such as 3G and 4G, a type that is connected through a short-range wireless communication method such as near field communication (NFC), radio frequency identification (RFID), and Wi-Fi.

The storage unit 320 functions to store various data and applications required for the operation of the service server 300. In particular, the storage unit 320 may sort and store various types of data and driving images received from the vehicle terminal device 100 for each terminal device. In addition, the storage unit 320 may store various programs for the operation of the service providing unit 330.

Here, the storage unit 320 may be implemented not only as an internal storage element such as a random access memory (RAM), a flash memory, a read-only memory (ROM), an erasable programmable ROM (EPROM), an electronically erasable and programmable (EEPROM), a register, a hard disk, a removable disk, a memory card, a universal subscriber identity module (USIM) but also as a removable storage such as a USB memory.

This storage unit 320 may be implemented in the service server 300 or may be implemented in the form of an external database (DB) server connected to the service server 300.

The service providing unit 330 may generate guidance information related to a specific driving situation of the vehicle by analyzing the data and the driving image received from the vehicle terminal device 100. Specifically, the service providing unit 330 may analyze and record location coordinates where a specific driving situation of the vehicle occurs using the location data received through the communication unit 310. In addition, the accident situation prediction guidance service providing unit 331 may generate accident situation prediction information for service provision, the accident legal guidance service providing unit 332 may generate accident legal evaluation information for service provision, the destination prediction guidance service providing unit 333 may generate the driver's destination prediction information for service provision, the driver's past driving history guidance service providing unit 334 may generate the vehicle driver's past driving history for service provision, and the other driver's past driving history guidance service providing unit 335 may generate the other driver's past driving history information for service provision.

In addition, the service providing unit 330 may provide a vehicle driving related guidance service based on the generated guidance information. Specifically, the service providing unit 330 may perform a guidance service related to driving of the vehicle by transmitting the generated guidance information to the vehicle terminal device 100 and the user terminal device 200. In this case, the vehicle terminal device 100 and the user terminal device 200 may provide driving related guidance through sound or a screen using the guidance information received from the service server 300.

The service providing unit 330 may include all or some of an accident situation prediction guidance service providing unit 331, an accident legal guidance service providing unit 332, a destination prediction guidance service providing unit 333, a driver's past driving history guidance service providing unit 334, and the other driver's past driving history guidance service providing unit 335.

Specifically, the accident situation prediction guidance service providing unit 331 may receive ADAS data, location data, driving data, and a driving image before a point in time of the first driving situation which involves an accident likelihood from the vehicle terminal device 100 and generate accident situation prediction information on an accident situation that might have occurred in the vehicle in the first driving situation by the received data and the driving image.

Here, the driving image may be a top-view image. This driving image will be described in detail with reference to FIG. 8.

Figure 8:
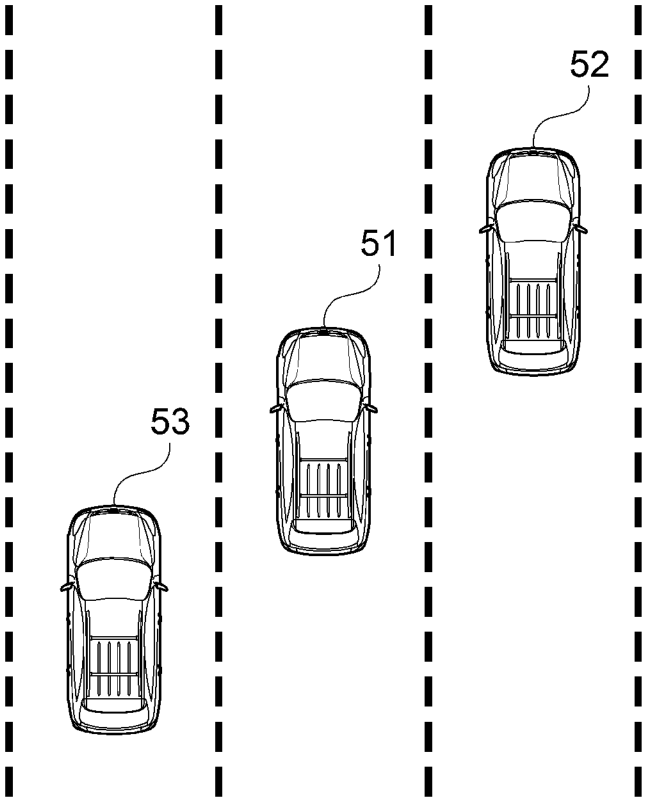
FIG. 8 is a diagram illustrating a top-view image according to an exemplary embodiment of the present invention.

FIG. 8 is a diagram illustrating a top-view image according to an exemplary embodiment of the present invention. Referring to FIG. 8, a top-view image is an image produced as a view from the top to the bottom. The top-view image may be generated by changing a camera view of a front driving image captured by the front camera of the vehicle and a camera view of a rear image captured by the rear camera to a view from the top to the bottom, and combining the changed front and rear images.

In addition, a top-view image with high accuracy may be generated by additionally combining a left image and a right image captured by left and right cameras with the image captured by the front and rear cameras of the vehicle.

As another example, a camera view of the front driving image captured by the front camera of the vehicle and a camera view of the rear image captured by the rear camera may be changed from the top to the bottom, and the changed front and rear images may be sequentially connected in time order to create a top-view image.

In the top-view image, an object 51 corresponding to the host vehicle may be disposed at a location of the host vehicle in the image, and objects 52 and 53 corresponding to other vehicles may be disposed at locations of the other vehicles in the image. Here, the objects 51, 52, and 53 may be expressed as an actual captured image of the vehicle or may be expressed as an image obtained by converting the vehicles into figures through animation or the like.

Meanwhile, the accident situation prediction guidance service providing unit 331 may detect vehicles in the front, rear, and sides of the host vehicle from the driving image, predicts an accident situation that might have occurred in the vehicle in the first driving situation using at least one of ADAS data and driving data of the host vehicle for the detected vehicles, and generate accident situation prediction information. Here, the ADAS data may include identification information of ADAS executed before the point in time of the first driving situation and data detected during the execution of ADAS (for example, a distance to a preceding vehicle, etc., in the case of FCWS). In addition, the driving data of the vehicle may include speed data of the vehicle before the point in time of the first driving situation, a steering angle of a steering device of the vehicle, steering torque data, fuel data of the vehicle, and the like. The operation of the accident situation prediction guidance service providing unit 331 will be described in more detail with reference to FIGS. 9A and 9B.

Figure 9A:
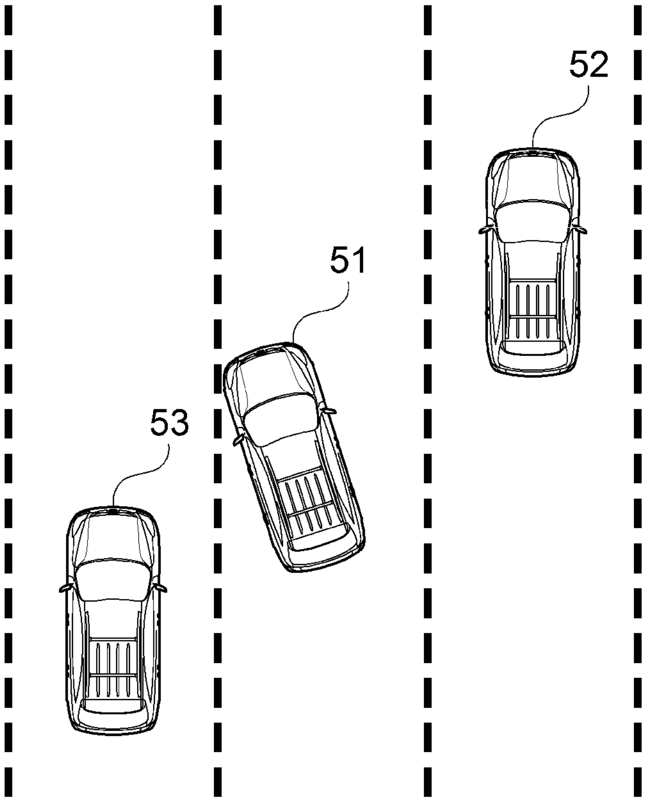
FIGS. 9A and 9B are diagrams showing a method for predicting an accident situation according to an exemplary embodiment of the present invention.
Figure 9B:
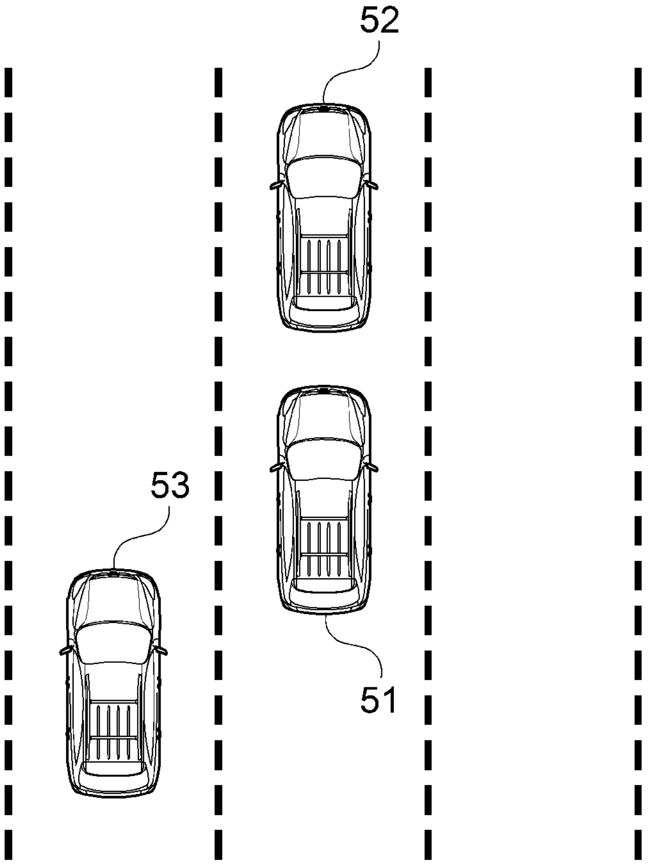

FIGS. 9A and 9B are diagrams showing a method for predicting an accident situation according to an exemplary embodiment of the present invention. FIG. 9A shows a top-view image of the first driving situation according to an exemplary embodiment of the present invention, in which the driver does not detect another vehicle 53 moving in a left lane while driving and finds the other vehicle while changing lanes and stops suddenly, and this may be the first situation which involved an accident likelihood even if the vehicle driven by the driver did not have an actual accident. In this case, the vehicle terminal device 100 may transmit ADAS data, location data, driving data, and the top-view image before a point in time of the first driving situation as shown in FIG. 9A to the service server 300.

Here, the accident situation prediction guidance service providing unit 331 may detect the vehicles 52 and 53 near the host vehicle 51 from the driving image and predict an accident situation that might have occurred in the vehicle in the first driving situation using at least one of the ADAS data and the driving data of the host vehicle 51 regarding the detected vehicles 52 and 53. Specifically, in the situation of FIG. 9A, the ADAS data may be the executed blind spot notification identification information and the data (distance to the rear left vehicle, etc.) detected in the process of executing the blind spot notification, and since a steering direction of the host vehicle 51, which is driving data, is the left, the accident situation prediction guidance service providing unit 331 may determine that the left vehicle 53 had an accident likelihood with the host vehicle 51 in the first driving situation.

In addition, the accident situation prediction guidance service providing unit 331 may predict the accident situation that might have occurred between the host vehicle 51 and the left vehicle 53. Specifically, the accident situation prediction guidance service providing unit 331 may generate accident situation prediction information of predicting an accident if the host vehicle 51 had moved as it is by analyzing the speed and the steering data of the host vehicle 51 and the distance data to the rear left vehicle detected in the process of executing the blind spot notification. For example, in the situation as shown in FIG. 9A, the accident situation prediction guidance service providing unit 331 may generate accident situation prediction information such as "Left rear collision could have occurred after about 3 seconds".

FIG. 9B shows a top-view image of the first driving situation according to another exemplary embodiment of the present invention. A case where the driver of the vehicle 51 drives without recognizing the vehicle 52 in front thereof and suddenly stops upon finding the preceding vehicle 52 may be the first driving situation in which the vehicle 51 driven by the driver did not have an accident actually but which involved an accident likelihood. In this case, the vehicle terminal device 100 may transmit ADAS data, location data, driving data, and the top-view image as shown in FIG. 9B before a point in time of the first driving situation to the service server 300.

Also, the accident situation prediction guidance service providing unit 331 may detect the neighbor vehicles 52 and 53 near the host vehicle 51 from the driving image and predict an accident situation that might have occurred in the vehicle in the first driving situation using at least one of the ADAS data and the driving data of the host vehicle 51 regarding the detected vehicles 52 and 53. Specifically, in the situation of FIG. 9B, the ADAS data is executed FCWS identification information and data (distance to the preceding vehicle, etc.) detected in the process of executing the FCWS and a steering direction of the host vehicle 51 as driving data is driving straight, and thus, the accident situation prediction guidance service providing unit 331 may determine that the preceding vehicle 52 had an accident likelihood with the host vehicle 51 in the first driving situation.

Also, the accident situation prediction guidance service providing unit 331 may predict the accident situation that might have occurred between the host vehicle 51 and the preceding vehicle 52. Specifically, the accident situation prediction guidance service providing unit 331 may generate accident situation prediction information that predicts an accident if the host vehicle 51 had moved as it is based on the speed and the steering data of the host vehicle 51, the distance data to the preceding vehicle detected in the process of executing the FCWS, and the speed of the preceding vehicle. For example, in the situation as shown in FIG. 9B, it is possible to generate information for predicting an accident situation such as "Forward collision could have occurred after about 3 seconds."

Meanwhile, the accident situation prediction guidance service providing unit 331 may predict an accident likelihood of the vehicle using an artificial neural network and provide information on a high accident likelihood to a vehicle expected to meet a specific condition.

To this end, the accident situation prediction guidance service providing unit 331 may further include a learning data collecting unit (not shown), a learning unit (not shown), and a memory storing an accident likelihood evaluation model generated according to learning.

The learning data collecting unit may collect driving images, driving data, ADAS data, location data, and accident data for each driving situation from each vehicle. Specifically, the learning data collecting unit may collect various driving related data such as driving images, driving data, ADAS data, location data, accident data, and road condition information from vehicles moving on the entire road using vehicle communication infrastructure such as V2V, V2I, and V2X.

The learning unit performs learning using various driving related data, such as driving images, driving data, ADAS data, location data, accident data, road condition information, etc. collected by the learning data collecting unit, and generate an accident likelihood prediction model as a result of learning. Here, the accident likelihood prediction model is an algorithm or program that predicts whether there was a possibility of an accident occurring in the vehicle through the collected data.

The accident likelihood prediction model may generate as an output whether there is an accident likelihood and accident situation prediction information, accident likelihood numerical value, etc. when there is an accident likelihood using the data, as an input, received during driving of the vehicle. Specifically, the accident likelihood prediction model may predict an accident likelihood for each driving situation of the vehicle and each road section and generate and provide accident situation prediction information including the accident likelihood to vehicles in a state that meets conditions (vehicle speed, driver's driving habit, driving information of neighbor vehicles, information of a condition of a road in which the vehicle is moving or located in a driving route of the vehicle, etc.) of the predicted result.

In addition, the learning unit may further train the accident likelihood prediction model using the output value. In addition, when the output result is an incorrect answer, the driver may input a response to the output result, and the learning unit may train the accident likelihood prediction model based on the driver's response.

That is, according to the present invention, the accident likelihood prediction model may be generated by performing machining learning or deep learning, and an accident likelihood of the vehicle may be predicted using the generated model, and a resultant value according to prediction may be provided to the driver. Here, for deep learning, a convolution neural network (CNN) algorithm, which is one of neural network models, may be applied. In this case, deep learning may be performed through augmented data by assuming various conditions of a driving image. Here, the condition defines a condition for converting an image collected as learning data to generate data for learning of the neural network model. Specifically, since various aspects may be exhibited by factors such as shift, rotation, brightness change, blur, etc. of the image, data may be augmented in consideration of the various aspects.

Meanwhile, the accident legal guidance service providing unit 332 may generate accident legal evaluation information based on details of the accident of the vehicle by receiving and analyzing the ADAS data, the location data, the driving data, and the driving image before or after a predetermined period of time from a point in time of the second driving situation in which the vehicle accident occurred. Specifically, the accident legal guidance service providing unit 332 may detect preceding, subsequent, and side vehicles of the host vehicle from the top-view image, analyze details of the accident using at least one of the ADAS data and the driving data of the host vehicle regarding the detected vehicle, and generate accident legal evaluation information including an accident negligence rate according to the analysis. Here, the driving image may be a top-view image.

In addition, the accident legal guidance service providing unit 332 may additionally display speeds, distances, time, etc. of the vehicles located near the vehicle to the driving image, so that an accident fault may be determined based on the facts.

The operation of the accident legal guidance service providing unit 332 according to an exemplary embodiment of the present invention will be described in more detail with reference to FIGS. 10A and 10B.

Figure 10A:
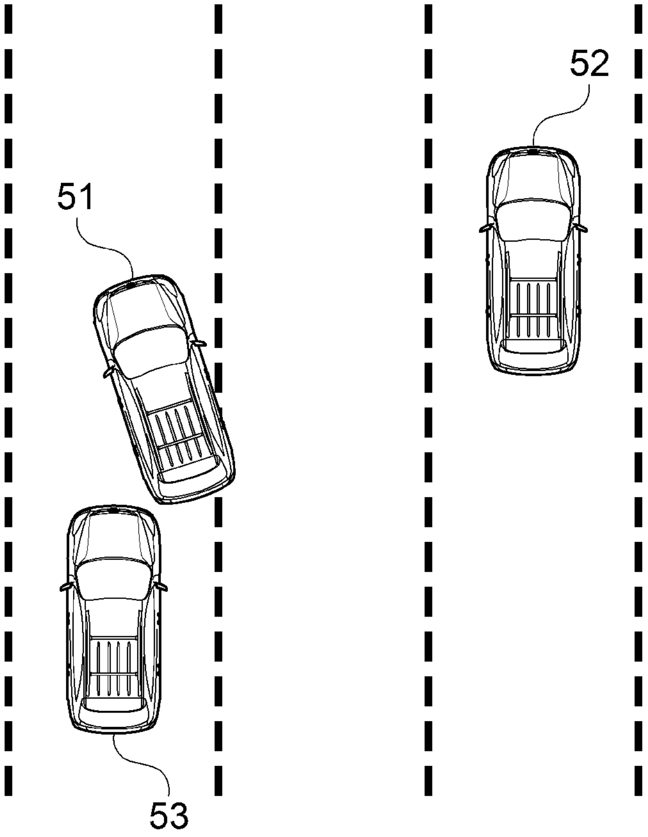
FIGS. 10A and 10B are diagrams showing a method for generating legal evaluation information according to an exemplary embodiment of the present invention.
Figure 10B:
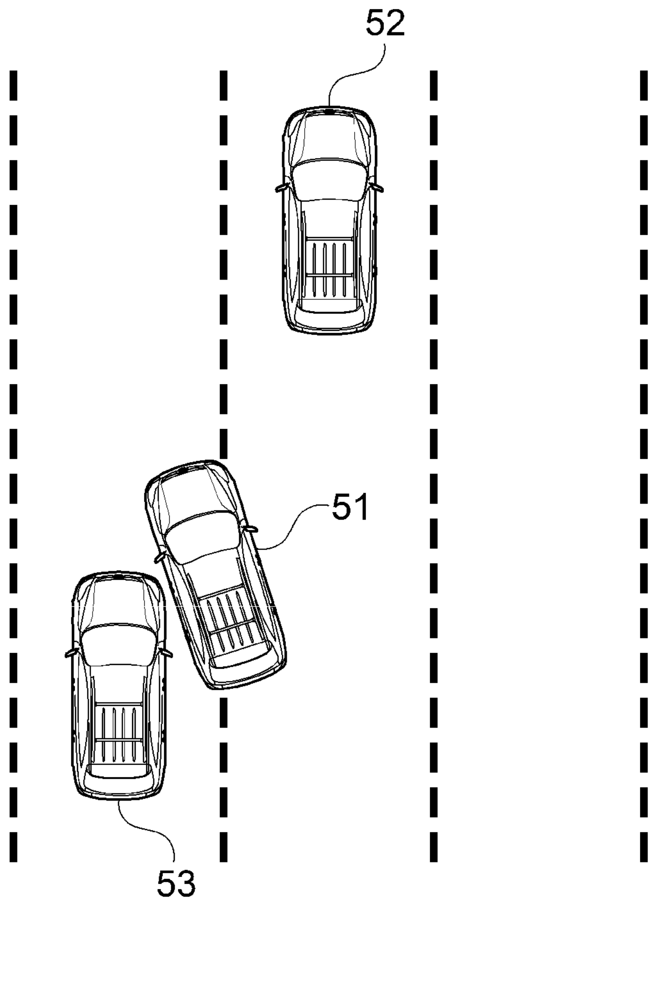

FIGS. 10A and 10B are diagrams showing a method for generating legal evaluation information according to an exemplary embodiment of the present invention. Referring to FIGS. 10A and 10B, FIG. 10A is a top-view image of the second driving situation according to an exemplary embodiment of the present invention, illustrating the second driving situation in which, in the process of changing to a left lane by the driver of the vehicle 51, the lane change was almost completed but the vehicle 53 located in the rear collides with the vehicle 51 to cause an accident because the blind spot notification was not performed. In this case, the vehicle terminal device 100 may transmit ADAS data, location data, driving data, and the top-view image as shown in FIG. 10A to the service server 300 before or after a predetermined period of time from a point in time of the second driving situation.

Also, the accident legal guidance service providing unit 332 may detect the vehicles 52 and 53 near the vehicle 51 from the driving image and analyze details of the accident that occurred in the vehicle in the second driving situation using at least one of the ADAS data and driving data of the vehicle 51 regarding the detected vehicles 52 and 53. Specifically, in the situation of FIG. 10A, the accident legal guidance service providing unit 332 may detect, as the accident vehicle 53, a vehicle closest to the vehicle 51 among the detected vehicles 52 and 53. Also, in the situation of FIG. 10A, the accident legal guidance service providing unit 332 may generate accident detail information indicating that the accident occurred due to the fault of the vehicle 53 in a state where the driver of the vehicle 51 did not perceive the vehicle 53 by analyzing data indicating that a blind spot notification was not executed before the lane change of the vehicle 51 and the fact that the speed of the vehicle 51 was not reduced until the point in time at which the accident of the vehicle occurred. In addition, the accident legal guidance service providing unit 332 may generate accident legal evaluation information including an accident fault rate based on the accident detail information.

FIG. 10B is a top-view image of the second driving situation according to another exemplary embodiment of the present invention, illustrating the second driving situation in which a blind spot notification was performed while the driver of the vehicle 51 changes to the left lane, but the vehicle 53 located at the rear collides with the vehicle 51 that attempts to change lanes to cause an accident. In this case, the vehicle terminal device 100 may transmit the ADAS data, the location data, the driving data, and the top-view image as shown in FIG. 10B to the service server 300 before or after a predetermined period of time from the point in time of the second driving situation.

Also, the accident legal guidance service providing unit 332 may detect the vehicles 52 and 53 near the vehicle 51 from the driving image and analyze details of the accident that occurred in the vehicle in the second driving situation using at least one of the ADAS data and the driving data of the vehicle 51 regarding the detected vehicles 52 and 53. Specifically, in the situation of FIG. 10B, the accident legal guidance service providing unit 332 may detect, as the vehicle 53, a vehicle closest to the vehicle 51 among the detected vehicles 52 and 53. Also, in the situation of FIG. 10B, the accident legal guidance service providing unit 332 may generate accident detail information indicating that the accident occurred due to a fault of the vehicle 51, while the driver of the vehicle 51 was able to perceive the vehicle 53 until the accident occurred between the accident vehicles 51 and 53 based on the data indicating that the blind spot notification included in the ADAS data was executed, distance data between the accident vehicles, and speed data and steering data of the vehicle 51 up to the point in time of the occurrence of the vehicle accident. In addition, the accident legal guidance service providing unit 332 may generate accident legal evaluation information including an accident fault rate based on the accident detail information.

Meanwhile, when a state of the vehicle is changed from parking to driving, the destination prediction guidance service providing unit 333 may determine an expected destination of the vehicle driver by comparing a vehicle location data with a previously stored destination data set for each parking location. The storage unit 320 may store a table in which parking location data of each vehicle driver and destination data oriented from a corresponding parking location are matched. In this case, when the state of the vehicle is changed from parking to driving, the destination prediction guidance service providing unit 333 may detect a destination candidate group corresponding to the parking location of the vehicle from the storage unit 320 based on the parking location data of the vehicle and determine an expected destination of the vehicle driver. For example, the destination prediction guidance service providing unit 333 may determine an expected destination of the vehicle driver from among the candidate destination groups in consideration of time, weather, and the like at a time when the state of the vehicle is changed from parking to driving.

The destination prediction guidance service providing unit 333 may provide a destination prediction guidance service using the determined expected destination. Specifically, the destination prediction guidance service providing unit 333 may generate destination prediction information such as "Expected destination of the vehicle at the current parking location is the office (work)" and transmit the destination prediction information to the vehicle terminal device 100 or the user terminal device 200. In this case, the vehicle terminal device 100 or the user terminal device 200 may perform guidance based on the received destination prediction information.

The driver's past driving history guidance service providing unit 334 may store the ADAS data set for each driving location for the vehicle driver and detect ADAS data corresponding to the location of the vehicle driver by comparing the location data of the vehicle with the previously stored ADAS data set for each driving location. Specifically, the storage unit 320 may store ADAS data for each driving location of the vehicle driver (e.g., executed ADAS identification information and detection information of executed ADAS). In this case, the driver's past driving history guidance service providing unit 334 may detect the ADAS data corresponding to the driving location of the vehicle from the storage unit 320 based on the location data during driving of the vehicle.

In this case, the driver's past driving history guidance service providing unit 334 may provide the driver's past driving history guidance service using the detected ADAS data. Specifically, the driver's past driving history information service providing unit 334 may generate past ADAS history information such as "Current location is the location where the blind spot notification was performed" and transmit the past ADAS history information to the vehicle terminal device 100 or the user terminal device 200, and in this case, the vehicle terminal device 100 or the user terminal device 200 may perform guidance based on the received past ADAS history information.

The other driver's past driving history guidance service providing unit 335 may store ADAS data set for each driving location for another driver and detect ADAS data corresponding to a location of the vehicle driver by comparing location data of the vehicle with the previously stored ADAS data set for each driving location. Specifically, the storage unit 320 may store ADAS data for each driving location of another driver (e.g., executed ADAS identification information, executed ADAS detection information, and the number of times). In this case, the other driver's past driving history guidance service providing unit 335 may detect the ADAS data of the other driver corresponding to the driving location of the vehicle from the storage unit 320 based on the location data during driving of the vehicle.

In this case, the other driver's past driving history guidance service providing unit 335 may provide the other driver's past driving history guidance service using the detected ADAS data. Specifically, the driver's past driving history information service providing unit 334 may generate past ADAS history information of the other driver such as "Current location is the location where a sharp curve notification was performed from multiple drivers" and transmit the information to the vehicle terminal device 100 or the user terminal device 200, and in this case, the vehicle terminal device 100 or the user terminal device 200 may perform guidance based on the received past ADAS history information of the other driver.

The controller 340 controls the overall operation of the service server 300. Specifically, the controller 340 may control all or some of the communication unit 310, the storage unit 320, and the service providing unit 330.

In particular, the controller 340 may provide a driving related guidance service of a vehicle in connection with the vehicle terminal device 100 and the user terminal device 200. Here, the driving related guidance service of the vehicle may include at least one of an accident situation prediction guidance service, an accident legal guidance service, a vehicle driver's destination prediction guidance service, a vehicle driver's past driving history guidance service, and another driver's past driving history guidance service.

Hereinafter, a method for providing a driving related guidance service by the service server 300 according to an exemplary embodiment of the present invention will be described in detail with reference to FIGS. 11 and 12.

Figure 11:
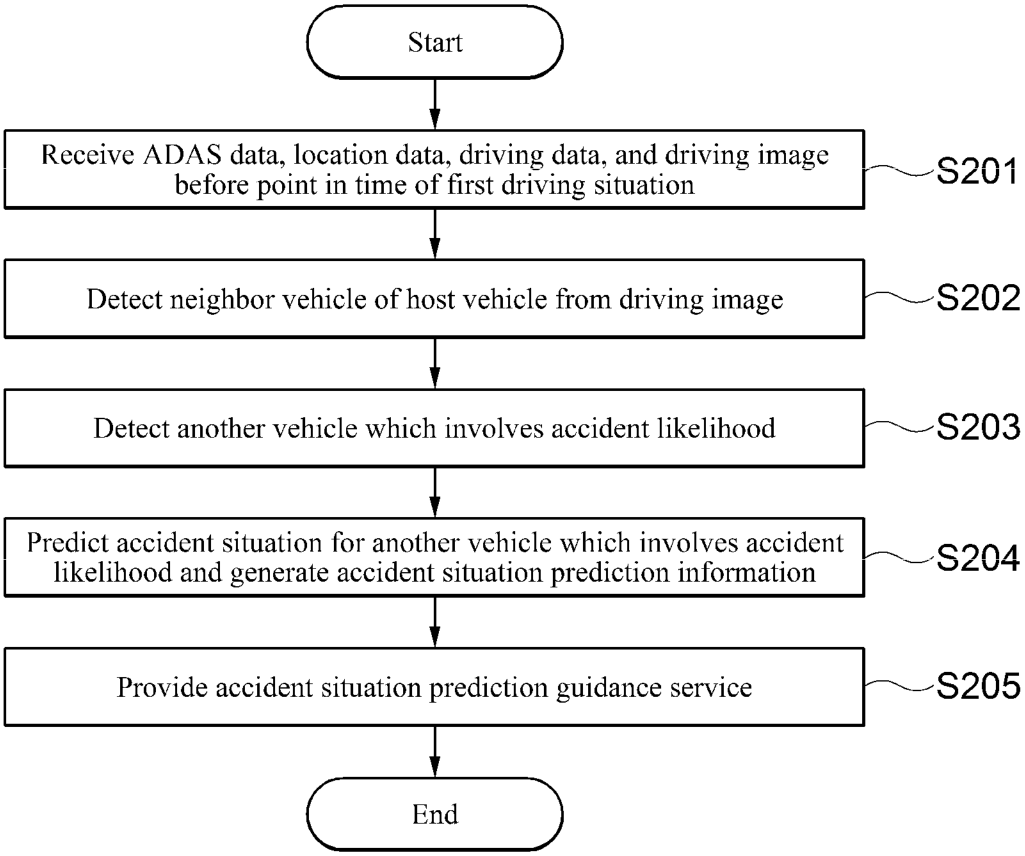
FIG. 11 is a flowchart illustrating a method for providing an accident situation prediction guidance service according to an exemplary embodiment of the present invention.

FIG. 11 is a flowchart illustrating a method for providing an accident situation prediction guidance service according to an exemplary embodiment of the present invention. Referring to FIG. 11, first, the service server 300 may receive ADAS data, location data, driving data, and a driving image before a point in time of the first driving situation in which an accident did not occur while the vehicle was moving but which involved an accident likelihood (S201). Here, the received driving image may be a top-view image in which a front driving image and a rear driving image are combined and a host vehicle object is placed at a location of the host vehicle in the combined image.

Then, the service server 300 may detect a neighbor vehicle of the host vehicle from the driving image (S202).

In addition, the service server 300 may detect another vehicle which involved an accident likelihood using at least one of ADAS data and driving data of the host vehicle regarding the detected vehicle (S203).

In addition, the service server 300 may predict an accident situation using at least one of ADAS data and driving data for the other vehicle which involved an accident likelihood, and generate accident situation prediction information (S204).

Also, the service server 300 may provide an accident situation prediction guidance service based on the generated accident situation prediction information (S205).

Figure 12:
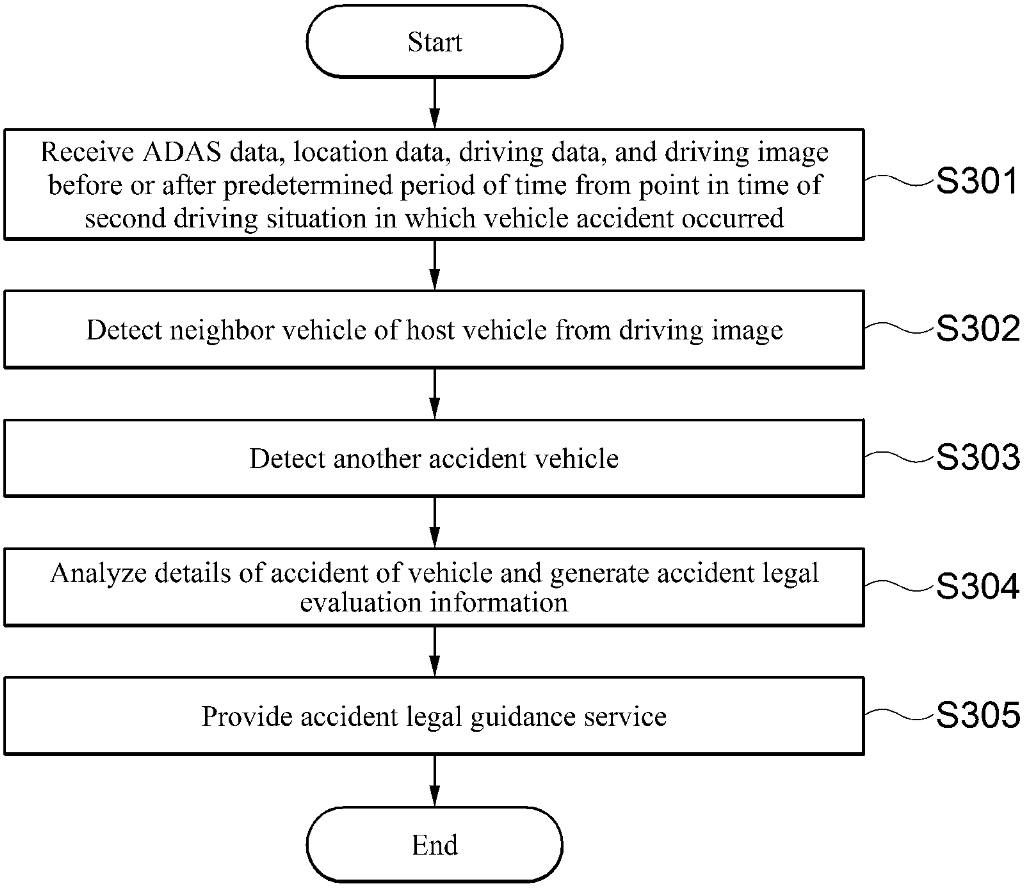
FIG. 12 is a flowchart illustrating a method for providing an accident legal guidance service according to an exemplary embodiment of the present invention.

FIG. 12 is a flowchart illustrating a method for providing an accident legal guidance service according to an exemplary embodiment of the present invention. Referring to FIG. 12, first, the service server 300 may receive ADAS data, location data, driving data, and a driving image before or after a predetermined period of time from a point in time of the second driving situation in which an accident occurred in the vehicle (S301).

Also, the service server 300 may detect neighbor vehicles of the host vehicle from the driving image (S302).

Also, the service server 300 may detect the other vehicle in which an accident occurred using at least one of the ADAS data and the driving data of the host vehicle regarding the detected vehicle (S303).

In addition, the service server 300 may analyze details of the accident of the vehicle using at least one of the ADAS data and the driving data of the host vehicle regarding the detected vehicle, and generate accident legal evaluation information (S304).

Also, the service server 300 may provide an accident legal guidance service based on the accident legal evaluation information (S305).

Meanwhile, the service providing method according to an exemplary embodiment of the present invention may further include storing a destination data set for each parking location for a driver of a vehicle, determining an expected destination of the vehicle driver by comparing location data of the vehicle with the previously stored destination data set for each parking location when a state of the vehicle is changed from parking to driving, and providing a destination prediction guidance service using the determined expected destination.

In addition, the service providing method according to an exemplary embodiment of the present invention may further include storing an ADAS data set for each driving location for a vehicle driver, detecting ADAS data corresponding to a location of the vehicle driver by comparing location data of the vehicle with the previously stored ADAS data set for each driving location, and providing the driver's past driving history guidance service using the detected ADAS data.

In addition, the service providing method according to an exemplary embodiment of the present invention may further include storing an ADAS data set for each driving location for another driver, detecting ADAS data corresponding to a location of the vehicle driver by comparing location data of the vehicle with the previously stored ADAS data set for each driving location, and providing the other driver's past driving history guidance service using the detected ADAS data.

Meanwhile, the functions according to an exemplary embodiment of the present invention described above may be implemented to be executed by a data processing device implemented as a module. That is, the data processing device according to the present invention may receive and analyze ADAS data, driving data, location data, and a driving image, and perform accident situation prediction, an accident legal evaluation, an expected destination determination, the driver's past driving history determination, and the other driver's past driving history determination according to the analysis.

Here, the data processing device may be implemented using software, hardware, or a combination thereof. For example, the hardware may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, micro-processors, and electrical units for performing other functions.

The data processing device may be mounted on the vehicle terminal device 100, the user terminal device 200, and the service server 300, and may perform accident situation prediction, an accident legal evaluation, an expected destination determination, the driver's past driving history determination, and the other driver's past driving history determination by analyzing various received data.

According to various exemplary embodiments of the present invention, by predicting an accident situation that may occur in a vehicle in the first driving situation which involves an accident likelihood, generating accident situation prediction information, and providing an accident situation prediction service, the driver may remind of a danger and driver's safe driving may be promoted.

In addition, according to various exemplary embodiments of the present invention, by analyzing details of an accident in the second driving situation in which the vehicle accident occurred, generating accident legal evaluation information including an accident fault rate according to the analysis, and providing an accident legal guidance service, legal services of financial factors such as vehicle repair costs and advice related to insurance may be automatically supported, thereby increasing the driver's convenience.

In addition, according to various exemplary embodiments of the present disclosure, the driver's convenience may be improved through a destination prediction guidance service, the driver's past driving history guidance service, and another driver's past driving history guidance service.

Meanwhile, the method for providing a driving related guidance service according to an exemplary embodiment of the present invention may further include storing a destination data set for each parking location for a driver of a vehicle, determining an expected destination of the vehicle driver by comparing location data of the vehicle with the previously stored destination data set for each parking location when a state of the vehicle is changed from parking to driving, and providing a destination prediction guidance service using the determined expected destination.

In addition, the method for providing a driving related guidance service according to an exemplary embodiment of the present invention may further include storing an ADAS data set for each driving location for a vehicle driver, detecting ADAS data corresponding to a location of the vehicle driver by comparing location data of the vehicle with the previously stored ADAS data set for each driving location, and providing the driver's past driving history guidance service using the detected ADAS data.

In addition, the method for providing a driving related guidance service according to an exemplary embodiment of the present invention may further include storing an ADAS data set for each driving location for another driver, detecting ADAS data corresponding to a location of the vehicle driver by comparing location data of the vehicle with the previously stored ADAS data set for each driving location, and providing the other driver's past driving history guidance service using the detected ADAS data.

Meanwhile, in the specification and the claims, terms such as "first", "second", "third", "fourth" and the like, if any, will be used to distinguish similar components from each other and be used to describe a specific sequence or a generation sequence, but is not necessarily limited thereto. It may be understood that these terms are compatible with each other under an appropriate environment so that exemplary embodiments of the present invention to be described below may be operated in a sequence different from a sequence shown or described herein. Likewise, in the present specification, in the case in which it is described that a method includes a series of steps, a sequence of these steps suggested herein is not necessarily a sequence in which these steps may be executed. That is, any described step may be omitted and/or any other step that is not described herein may be added to the method.

In addition, in the specification and the claims, terms such as "left", "right", "front", "rear", "top", "bottom.", "over", "under", and the like do not necessarily indicate relative positions that are not changed, but are used for explanation. It will be understood that these terms are compatible with each other under an appropriate environment so that exemplary embodiments of the present invention set forth herein may be operated in a direction different from a direction illustrated or described herein. The term. "connected" as used herein is defined as being connected directly or indirectly in an electrical or non-electrical manner. Here, targets described as being "adjacent to" each other may physically contact each other, be close to each other, or be in the same general range or region, in a context in which the above phrase is used. Here, the presence of phrase "in an exemplary embodiment" means the same exemplary embodiment, but is not necessarily limited thereto.

In addition, in the specification and the claims, terms such as "connected", "connecting", "linked", "linking", "coupled", "coupling", and the like, and various modifications of these terms may be used as the meaning including that one component is directly connected to another component or is indirectly connected to another component through the other component.

In addition, terms "module" and "unit" for components used in the present specification are used only in order to easily make the specification. Therefore, these terms do not have meanings or roles that distinguish from each other in themselves.

Terms used in the present disclosure are for explaining exemplary embodiments rather than limiting the present invention. Unless explicitly described to the contrary, a singular form includes a plural form in the present specification. The word "comprise" and variations such as "comprises" or "comprising," will be understood to imply the inclusion of stated constituents, steps, operations and/or elements but not the exclusion of any other constituents, steps, operations and/or elements.

Hereinabove, the present invention has been described with reference to the exemplary embodiments thereof. All exemplary embodiments and conditional illustrations disclosed in the present specification have been described to intend to assist in the understanding of the principle and the concept of the present invention by those skilled in the art to which the present invention pertains. Therefore, it will be understood by those skilled in the art to which the present invention pertains that the present invention may be implemented in modified forms without departing from the spirit and scope of the present invention.

Therefore, the exemplary embodiments disclosed herein should be considered in an illustrative aspect rather than a restrictive aspect. The scope of the present invention is shown in the claims rather than the foregoing description, and all differences within the equivalent range should be interpreted as being included in the present invention.

Meanwhile, the method for providing a driving related guidance service according to various exemplary embodiments of the present invention described above may be implemented as programs and be provided to servers or devices. Therefore, the respective apparatuses may access the servers or the devices in which the programs are stored to download the programs.

In addition, the method according to various exemplary embodiments of the present invention described above may be implemented as a program and stored in various non-transitory computer readable media and provided. The non-transitory computer readable medium is not a medium that stores data fora short time such as a register, a cache, a memory, or the like, but means a machine readable medium that semi-permanently stores data. Specifically, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although the exemplary embodiments of the present invention have been illustrated and described hereinabove, the present invention is not limited to the specific exemplary embodiments described above, but may be variously modified by those skilled in the art to which the present invention pertains without departing from the scope and spirit of the present invention as claimed in the claims. These modifications should also be understood to fall within the technical spirit and scope of the present invention.

What is claimed is:

1. A method for providing a driving related guidance service by a vehicle terminal device, the method comprising:

acquiring a driving image captured during driving of a vehicle;

receiving advanced driver assistance system (ADAS) data of the vehicle from an ADAS module that assists driving of the vehicle and receiving driving data of the vehicle from an electronic control unit (ECU) module of the vehicle;

detecting an impact level;

receiving location data of the vehicle; and transmitting, to a service server, the ADAS data, the location data, the driving data, and the driving image related to a specific driving situation detected during driving of the vehicle, when guidance information related to a specific driving situation of the vehicle is generated in the service server, receiving the generated guidance information;

determining a first driving situation when an impact which exceeds a preset first impact level and which is less than a preset second impact level is detected and execution of an ADAS function is detected based on the ADAS data before the impact is detected; and determining a second driving situation when an impact which exceeds the preset second impact level is detected, wherein the first driving situation is a situation in which an accident did not occur while the vehicle was moving but which involved an accident likelihood, wherein the second driving situation is a situation in which an accident occurred while the vehicle was moving.

2. The method of claim 1, wherein the transmitting comprising:

determining that the specific driving situation is not the first driving situation and the second driving situation when an impact which exceeds a preset first impact level and which is less than a preset second impact level is detected and execution of an ADAS function is not detected based on the ADAS data before the impact is detected.

3. The method of claim 1, wherein the transmitting comprising:

transmitting, when the first driving situation in which an accident did not occur while the vehicle was moving but which involved an accident likelihood is detected, the ADAS data, the location data, the driving data, and the driving image before point in time of the detected first driving situation.

4. The method of claim 3, wherein the transmitting comprising:

transmitting, to the service server, the ADAS data, the location data, the driving data, and the driving image before and after a predetermined period of time from a point in time of a second driving situation in which an accident occurred during driving of the vehicle, when the second driving situation is detected.

5. The method of claim 4, wherein the acquiring of the driving image captured during driving of the vehicle includes:

acquiring a front driving image captured by a front camera and a rear driving image captured by a rear camera, and further includes:

combining the front driving image and the rear driving image and generating a top-view image in which a host vehicle object is placed at a location of a host vehicle in the combined image, wherein the driving image transmitted to the service server is the top-view image.

6. The method of claim 5, wherein the top-view image has a graphics interchange format (GIF) format formed by extracting a plurality of frames.

7. The method of claim 4, further comprising:

when accident legal evaluation information is generated based on the data received from the vehicle terminal device in the service server, receiving the generated accident legal evaluation information; and performing guidance based on the received accident legal evaluation information.

8. The method of claim 3, further comprising:

when accident situation prediction information on an accident situation which might have occurred in the vehicle is generated based on the data received from the vehicle terminal device in the service server, receiving the generated accident situation prediction information; and performing guidance based on the received accident situation prediction information.

9. The method of claim 1, wherein the ADAS data includes at least one of a lane departure notification, a forward collision, a sharp curve notification, a sudden stop notification, a sudden turn notification, and a blind spot notification.

10. A method for providing a driving related guidance service by a service server, the method comprising:

receiving advanced driver assistance system (ADAS) data of a vehicle related to a specific driving situation of the vehicle, location data of the vehicle, driving data of the vehicle, and a driving image captured during driving of the vehicle from a vehicle terminal device;

generating guidance information related to the specific driving situation of the vehicle by analyzing the received data and the driving image; and providing a driving related guidance service for the vehicle using the generated guidance information, wherein the specific driving situation is a first driving situation in which an accident did not occur while the vehicle was moving but which involved an accident likelihood, and a second driving situation in which an accident occurred while the vehicle was moving, wherein the vehicle is determined to be in a first driving situation when an impact which exceeds a preset first impact level and which is less than a preset second impact level is detected and execution of an ADAS function is detected based on the ADAS data before the impact is detected, and wherein the vehicle is determined to be in a second driving situation when an impact which exceeds the preset second impact level is detected, wherein the generating includes generating different guidance information depending on the first driving situation or the second driving situation.

11. The method of claim 10, wherein, in the generating, accident situation prediction information on an accident situation which might have occurred in the first driving situation is generated by analyzing the ADAS data, the location data, the driving data, and the driving image before a point in time of the first driving situation in which an accident did not occur while the vehicle was moving but which involved an accident likelihood, and in the providing, an accident situation prediction guidance service is provided using the generated accident situation prediction information.

12. The method of claim 11, wherein, in the generating, an accident legal evaluation information is generated by analyzing the ADAS data, the location data, the driving data, and the driving image before and after a predetermined period of time from a point in time of the second driving situation at which an accident occurs in the vehicle, and in the providing, an accident legal guidance service is provided using the generated accident legal evaluation information.

13. The method of claim 12, wherein the received driving image is a top-view image in which a front driving image and a rear driving image are combined and in which a host vehicle object is placed at a location of a host vehicle in the combined image.

14. The method of claim 13, wherein the generating of the accident situation prediction information includes:

detecting a neighbor vehicle of the host vehicle from the top-view image; and predicting an accident situation which might have occurred in the vehicle in the first driving situation using at least one of ADAS data and driving data of the host vehicle for the detected vehicle and generating the accident situation prediction information.

15. The method of claim 13, wherein the generating of the accident legal evaluation information includes:

detecting a neighbor vehicle of the host vehicle from the top-view image;

analyzing an accident negligence rate using at least one of the ADAS data and the driving data of the host vehicle for the detected vehicle; and generating the accident legal evaluation information including the accident negligence rate according to the analysis.

16. The method of claim 12, further comprising:

storing a destination data set for each parking location for a driver of the vehicle;

determining an expected destination of the vehicle driver by comparing location data of the vehicle with the previously stored destination data set for each parking location when the vehicle is switched from parking to a driving state; and providing a destination prediction guidance service using the determined expected destination.

17. The method of claim 12, further comprising:

storing a ADAS data set for each driving location for the vehicle driver;

detecting ADAS data corresponding to a location of the vehicle driver by comparing the location data of the vehicle with the previously stored ADAS data set for each driving location; and providing the driver's past driving history guidance service using the detected ADAS data.

18. The method of claim 12, further comprising:

storing an ADAS data set for each driving location for another driver;

detecting ADAS data corresponding to a location of the vehicle driver by comparing the location data of the vehicle with the previously stored ADAS data set for each driving location; and providing the other driver's past driving history guidance service using the detected ADAS data.

19. A vehicle terminal device comprising:

a communication unit;

an image acquisition unit acquiring a driving image captured during driving of a vehicle;

an advanced driver assistance system (ADAS) data acquisition unit receiving ADAS data from an ADAS module which assists driving of the vehicle;

an electronic control unit (ECU) data acquisition unit receiving driving data of the vehicle from an ECU module of the vehicle;

an impact detection unit detecting an impact level;

a location data acquisition unit receiving location data of the vehicle; and a controller controlling the communication unit to transmit the ADAS data related to a specific driving situation detected during driving of the vehicle, the location data, the driving data of the vehicle, and the driving image to a service server, wherein when guidance information related to a specific driving situation of the vehicle is generated in the service server, the controller receives the generated guidance information, wherein the controller determines a first driving situation when an impact which exceeds a preset first impact level and which is less than a preset second impact level is detected and execution of an ADAS function is detected based on the ADAS data before the impact is detected and determines a second driving situation when an impact which exceeds the preset second impact level is detected, wherein the first driving situation is a situation in which an accident did not occur while the vehicle was moving but which involved an accident likelihood, wherein the second driving situation is a situation in which an accident occurred while the vehicle was moving.

20. The vehicle terminal device of claim 19, wherein the controller determines that the specific driving situation is not the first driving situation and the second driving situation when an impact which exceeds a preset first impact level and which is less than a preset second impact level is detected and execution of an ADAS function is not detected based on the ADAS data before the impact is detected.

* * * * *